US012585950B2

(12) United States Patent
Bahk et al.

(10) Patent No.: US 12,585,950 B2
(45) Date of Patent: Mar. 24, 2026

(54) METHOD AND ELECTRONIC DEVICE FOR PERFORMING DEEP NEURAL NETWORK OPERATION

(71) Applicant: SAMSUNG ELECTRONICS CO., LTD., Suwon-si (KR)

(72) Inventors: Cheongyo Bahk, Suwon-si (KR); Eunji Jeong, Suwon-si (KR); Jonghun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 663 days.

(21) Appl. No.: 18/078,199

(22) Filed: Dec. 9, 2022

(65) Prior Publication Data

US 2023/0129845 A1    Apr. 27, 2023

Related U.S. Application Data

(63) Continuation of application No. PCT/KR2022/016375, filed on Oct. 25, 2022.

(30) Foreign Application Priority Data

| Oct. 26, 2021 | (KR) | ......................... 10-2021-0143993 |
| Sep. 14, 2022 | (KR) | ......................... 10-2022-0115794 |
| Oct. 7, 2022 | (KR) | ......................... 10-2022-0129039 |

(51) Int. Cl.
*G06N 3/082* (2023.01)
*G06T 1/20* (2006.01)

(52) U.S. Cl.
CPC .............. *G06N 3/082* (2013.01); *G06T 1/20* (2013.01)

(58) Field of Classification Search
None
See application file for complete search history.

(56) References Cited

U.S. PATENT DOCUMENTS

| 2019/0163716 A1 | 5/2019 | Li et al. |
| 2019/0206020 A1* | 7/2019 | Ould-Ahmed-Vall ...................... G06N 3/063 |

(Continued)

FOREIGN PATENT DOCUMENTS

| JP | 2020-109647 A | 7/2020 |
| KR | 10-2019-0113119 A | 10/2019 |

(Continued)

OTHER PUBLICATIONS

"A Convolutional Neural Network Accelerator Architecture with Fine-Granular Mixed Precision Configurability"; Xian Zhou; Li Zhang; Chuliang Guo; Xunzhao Yin; Cheng Zhuo; 2020 IEEE International Symposium on Circuits and Systems (ISCAS) (Year: 2020).*

(Continued)

*Primary Examiner* — Michael Alsip
(74) *Attorney, Agent, or Firm* — Sughrue Mion, PLLC

(57) ABSTRACT

A method by which an electronic device performs a DNN operation includes performing a first modified operation including extending a channel of an output of a first layer with respect to a feature map input into the first layer, the first layer being one of a plurality of layers of a DNN, wherein the first modified operation includes a space-to-depth transformation operation, performing a neural network operation corresponding to layers between the first layer and a second layer as a channel-extended neural network operation, wherein the second layer is a layer of the plurality of layers of the DNN after the first layer, performing a second modified operation including reducing a channel of an output of the second layer with respect to a channel-extended feature map input into the second layer, wherein the second modified operation includes a depth-to- (Continued)

INPUT DATA ─101    DEEP NEURAL NETWORK ─102    OUTPUT DATA ─103

MODIFIED OPERATION
105

2000 space transformation operation, and outputting a result of the DNN operation.

13 Claims, 17 Drawing Sheets

(56) References Cited

U.S. PATENT DOCUMENTS

| | | | |
|---|---|---|---|
| 2019/0279005 A1* | 9/2019 | Ogale | G05D 1/0221 |
| 2020/0051217 A1* | 2/2020 | Shen | G06T 7/11 |
| 2020/0210843 A1 | 7/2020 | Tao et al. | |
| 2021/0104015 A1 | 4/2021 | Wang et al. | |
| 2021/0182204 A1 | 6/2021 | Chao et al. | |
| 2021/0366081 A1 | 11/2021 | Kim et al. | |
| 2022/0019869 A1 | 1/2022 | Li et al. | |
| 2022/0058774 A1* | 2/2022 | Zhu | G06T 5/60 |
| 2022/0157041 A1 | 5/2022 | Han et al. | |

FOREIGN PATENT DOCUMENTS

| | | |
|---|---|---|
| KR | 10-2038390 B1 | 10/2019 |
| KR | 10-2165273 B1 | 10/2020 |
| KR | 10-2021-0024126 A | 3/2021 |
| KR | 10-2316528 B1 | 10/2021 |
| WO | 2019/143026 A1 | 7/2019 |
| WO | 2021/018245 A1 | 2/2021 |
| WO | 2023/059336 A1 | 4/2023 |

OTHER PUBLICATIONS

International Search Report (PCT/ISA/210) issued Feb. 3, 2023 by the International Searching Authority in counterpart International patent Application No. PCT/KR2022/016375.

* cited by examiner

FIG. 2

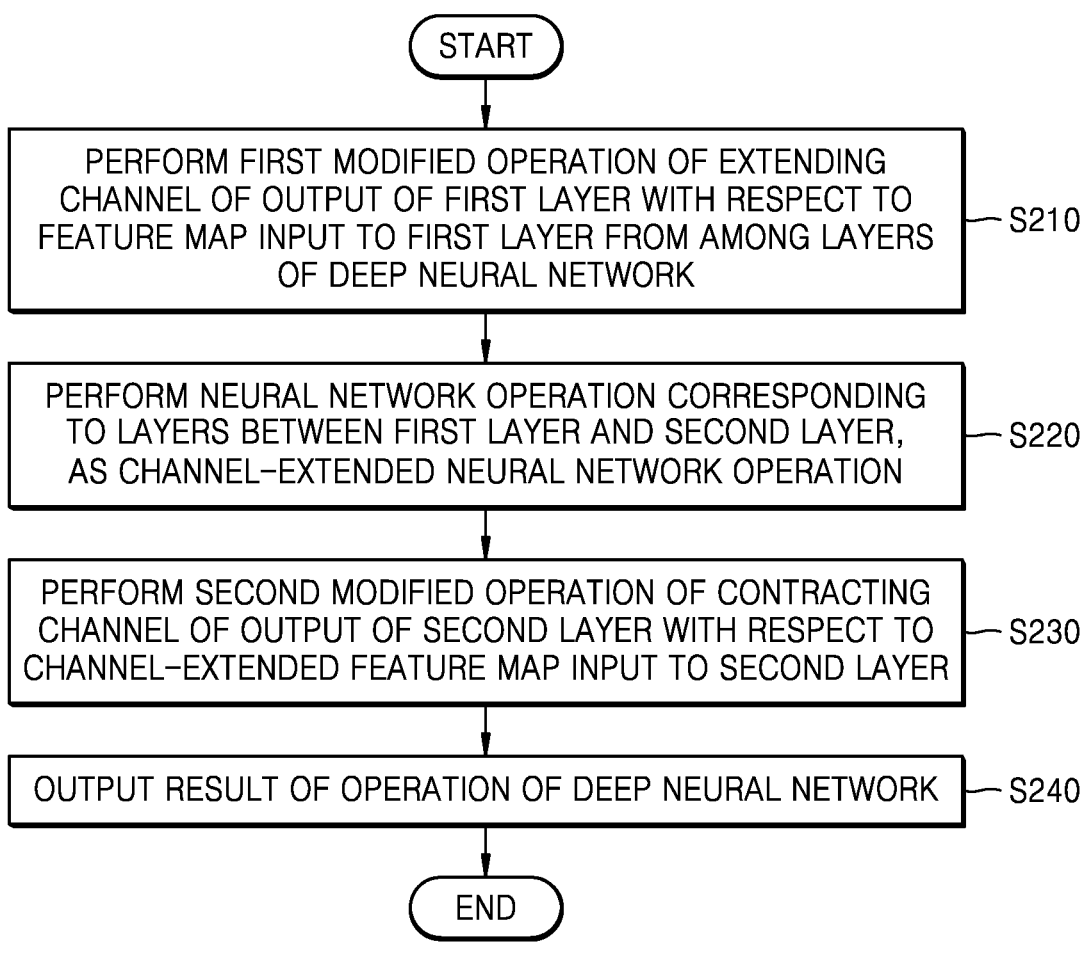

START

PERFORM FIRST MODIFIED OPERATION OF EXTENDING CHANNEL OF OUTPUT OF FIRST LAYER WITH RESPECT TO FEATURE MAP INPUT TO FIRST LAYER FROM AMONG LAYERS OF DEEP NEURAL NETWORK — S210

PERFORM NEURAL NETWORK OPERATION CORRESPONDING TO LAYERS BETWEEN FIRST LAYER AND SECOND LAYER, AS CHANNEL-EXTENDED NEURAL NETWORK OPERATION — S220

PERFORM SECOND MODIFIED OPERATION OF CONTRACTING CHANNEL OF OUTPUT OF SECOND LAYER WITH RESPECT TO CHANNEL-EXTENDED FEATURE MAP INPUT TO SECOND LAYER — S230

OUTPUT RESULT OF OPERATION OF DEEP NEURAL NETWORK — S240

END

Original Conv2D Kernel $K_H = 3$, $K_W = 3$, $C_I = 2$, $C_O = 1$ $$513 \atop \mathrm{KER}_2 \left( \begin{array}{l} K_{h1} + STR_{h1}\, b_h, \\ K_{w1} + STR_{w1}\, b_w, \\ d_i, \\ d_o + D_o\,(\, b_w + B_w\, b_h \,) \end{array} \right) = KER_1(k_{h1}, k_{w1}, d_i, d_o)$$

FIG. 5E
Original Conv2D Kernel
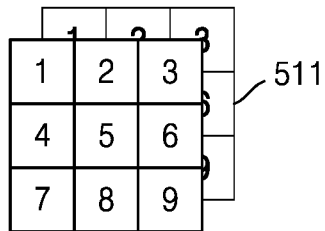
$K_H = 3$, $K_W = 3$, $C_I = 2$, $C_O = 1$
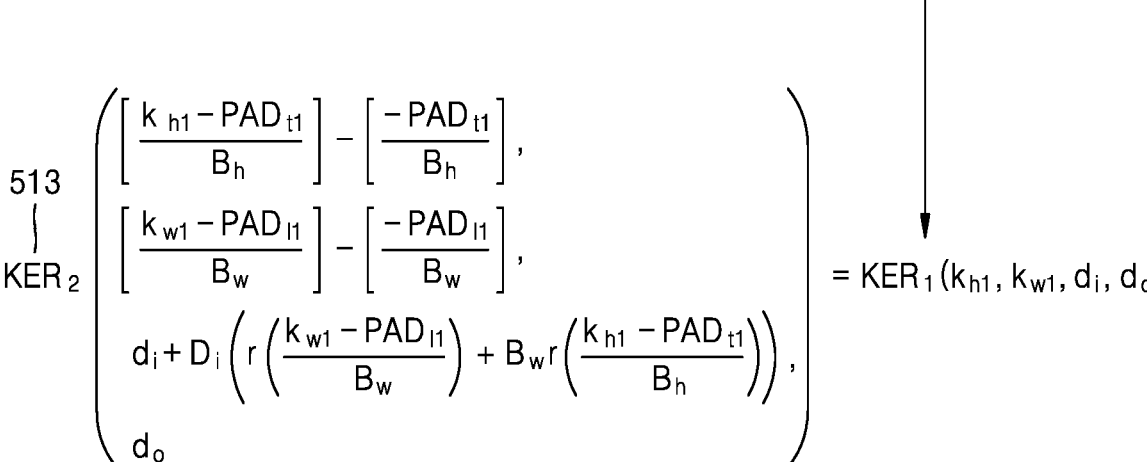

810
Original IFM

820
Original Conv2D Kernel

830
Original OFM $K_H = 3$, $K_W = 3$, $C_I = 2$, $C_O = 1$

FIG. 8C

Channel-extended IFM  850

Channel-extended Conv2D Kernel  860

Channel-extended OFM  870

$K_H = 2$, $K_W = 2$, $C_I = 8$, $C_O = 4$

METHOD AND ELECTRONIC DEVICE FOR PERFORMING DEEP NEURAL NETWORK OPERATION

CROSS-REFERENCE TO RELATED APPLICATIONS

This application is a continuation application of International Application No. PCT/KR2022/016375, filed on Oct. 25, 2022, which claims priority to Korean Patent Application No. 10-2021-0143993 filed on Oct. 26, 2021 in the Korean Intellectual Property Office, Korean Patent Application No. 10-2022-0115794 filed on Sep. 14, 2022 in the Korean Intellectual Property Office, and Korean Patent Application No. 10-2022-0129039 filed on Oct. 7, 2022 in the Korean Intellectual Property Office, the disclosures of which are herein incorporated by reference.

TECHNICAL FIELD

Provided are an electronic device for applying an algorithm for improving the efficiency of a neural network operation, and an operating method of the electronic device.

BACKGROUND ART

A deep neural network operation depends on hardware that performs the operation and an architecture of a deep neural network model. The performance of hardware for improving the efficiency of a deep neural network operation has been improved over time, and various deep neural network models and algorithms for performing operations have also been developed. Even with the same deep neural network model, when hardware that performs a deep neural network operation is different, an operation speed, hardware utilization efficiency, etc. may vary according to the performance of hardware that performs the operation. In a deep neural network operation using a deep neural network model, various algorithms for performing optimized operations according to hardware specifications have recently been used.

DESCRIPTION OF EMBODIMENTS

Solution to Problem

A method by which an electronic device performs a deep neural network (DNN) operation may include: performing a first modified operation, the first modified operation comprising extending a channel of an output of a first layer with respect to a feature map input into the first layer, the first layer being one of a plurality of layers of a DNN, wherein the first modified operation comprises a space-to-depth transformation operation; performing a neural network operation corresponding to layers between the first layer and a second layer as a channel-extended neural network operation, wherein the second layer is a layer of the plurality of layers of the DNN after the first layer; performing a second modified operation, the second modified operation comprising reducing a channel of an output of the second layer with respect to a channel-extended feature map input into the second layer, wherein the second modified operation comprises a depth-to-space transformation operation; and outputting a result of the DNN operation.

An electronic device for performing a deep neural network (DNN) operation may include: an accelerator; a memory storing one or more instructions; and at least one processor configured to execute the one or more instructions stored in the memory to perform a first modified operation, the first modified operation comprising extending a channel of an output of a first layer with respect to a feature map input into the first layer, the first layer being one of a plurality of layers of a DNN, wherein the first modified operation comprises a space-to-depth transformation operation. The at least one processor may be configured to execute the one or more instructions to perform a neural network corresponding to layers between the first layer and a second layer as a channel-extended neural network operation, by using the accelerator, wherein the second layer is a layer of the plurality of layers of the DNN after the first layer, perform a second modified operation, the second modified operation comprising reducing a channel of an output of the second layer with respect to a channel-extended feature map input into the second layer, wherein the second modified operation comprises a depth-to-space transformation operation, and output a result of the DNN operation.

A non-transitory computer-readable recording medium having recorded thereon a program for executing, on a computer, a method by which an electronic device performs a deep neural network (DNN) operation may include: performing a first modified operation, the first modified operation comprising extending a channel of an output of a first layer with respect to a feature map input into the first layer, the first layer being one of a plurality of layers of a DNN, wherein the first modified operation comprises a space-to-depth transformation operation; performing a neural network operation corresponding to layers between the first layer and a second layer as a channel-extended neural network operation, wherein the second layer is a layer of the plurality of layers of the DNN after the first layer; performing a second modified operation, the second modified operation comprising reducing a channel of an output of the second layer with respect to a channel-extended feature map input into the second layer, wherein the second modified operation comprises a depth-to-space transformation operation; and outputting a result of the DNN operation.

BRIEF DESCRIPTION OF DRAWINGS

FIG. 2 is a flowchart for describing a method by which an electronic device performs a deep neural network operation, according to an embodiment of the disclosure.

FIG. 5E is a diagram for describing a specific example of FIG. 5D.

FIGS. 8A through 8C are diagrams for describing an example where a deep neural network operation performed by an electronic device is a convolution operation, according to an embodiment of the disclosure, wherein FIG. 8A is a diagram for describing an original convolution operation, FIG. 8B is a diagram for further describing the original convolution operation, and FIG. 8C is a diagram for describing that an electronic device extends a channel of a feature to perform a convolution operation, according to an embodiment of the disclosure.

MODE OF DISCLOSURE

Figure 1:
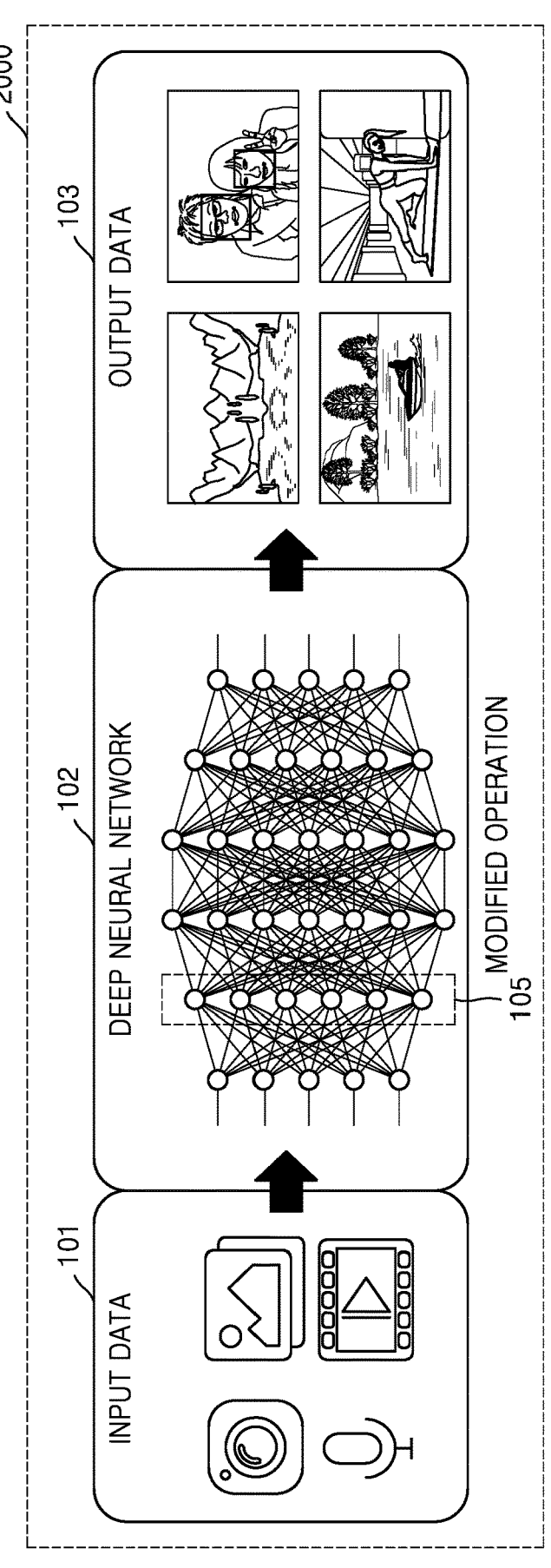
FIG. 1 is a diagram for schematically describing a feature in which an electronic device performs a deep neural network operation, according to an embodiment of the disclosure.

Throughout the disclosure, the expression "at least one of a, b or c" indicates only a, only b, only c, both a and b, both a and c, both b and c, all of a, b, and c, or variations thereof.

The terms used herein will be briefly described, and the disclosure will be described in detail. All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some of the terms used herein may be arbitrarily chosen by the present applicant, and in this case, these terms are defined in detail below. Accordingly, the specific terms used herein should be defined based on the unique meanings thereof and the whole context of the disclosure.

An expression used in the singular may encompass the expression in the plural, unless it has a clearly different meaning in the context. Terms used herein, including technical or scientific terms, may have the same meaning as commonly understood by one of ordinary skill in the art described in the disclosure.

It will be understood that when a certain part "includes" a certain component, the part does not exclude another component but may further include another component, unless the context clearly dictates otherwise. Also, the term used in the embodiments such as " . . . unit" or " . . . module" indicates a unit for processing at least one function or operation, and may be implemented in hardware, software, or in a combination of hardware and software.

The disclosure will now be described more fully with reference to the accompanying drawings for one of ordinary skill in the art to be able to perform the disclosure without any difficulty. However, the disclosure may be implemented in various different forms and is not limited to the embodiments described herein. Also, in the drawings, parts irrelevant to the description are omitted in order to clearly describe the disclosure, and like reference numerals designate like elements throughout the specification.

FIG. 1 is a diagram for schematically describing a feature in which an electronic device performs a deep neural network operation, according to an embodiment of the disclosure.

Referring to FIG. 1, an electronic device 2000 may receive input data 101, may perform a neural network operation by using a deep neural network model 102 in the electronic device, and may obtain output data 103 indicating an inference result. Examples of the electronic device 2000 may include a smartphone, a smart TV, a smart home appliance, a mobile device, an image display device, a desktop computer, and a server. However, the disclosure is not limited thereto, and the electronic device 2000 may include any electronic device capable of performing a deep neural network operation.

The electronic device 2000 may use various types of deep neural network models 102, and thus, the types of input data 101 and the resulting output data 103 may also be diversified. For example, the electronic device 2000 may perform a task such as image quality enhancement, object detection, object classification, or screen classification, by using the deep neural network model 102.

In some embodiments, a neural network operation performed by the electronic device 2000 may include a parallel operation (e.g., multiplication) using an accelerator. When the electronic device 2000 performs a neural network operation, multiply-accumulate (MAC) units used to calculate a meaningful value in the accelerator may be proportional to channels of a feature map. Accordingly, when channels of a feature map are less than MAC units, a valid operation may be performed only in some MAC units, and thus, the utilization efficiency of the accelerator of the electronic device 2000 is low. In order to improve the utilization efficiency of the accelerator, the electronic device 2000 may perform an operation in a state where a channel of input/output data of a neural network operation is extended.

In some embodiments, the electronic device 2000 may modify an operation performed in the deep neural network model 102. For example, the electronic device 2000 may perform a first modified operation of extending a channel of an output of a first layer 105, on a feature map input to the first layer 105 from among layers of the deep neural network model 102. The first modified operation may include a space-to-depth transformation operation, and may include an operation capable of deriving a result equivalent to an original neural network operation of the first layer 105.

When the channel of the output from the first layer 105 is extended, the electronic device 2000 may perform subsequent operations as a channel-extended neural network operation. In order to end the channel-extended neural network operation performed in subsequent layers, the electronic device 2000 may perform a second modified operation of contracting an output of a second layer, on a channel-extended feature map input to the second layer. The second modified operation may include a depth-to-space transformation operation, and may include an operation capable of deriving a result equivalent to an original neural network operation of the second layer.

Accordingly, when the electronic device 2000 obtains the output data 103 of the deep neural network model 102 by applying a modified operation, the same result as an original operation of the deep neural network model 102 may be obtained and accelerator operation efficiency may be improved.

FIG. 2 is a flowchart for describing a method by which an electronic device performs a deep neural network operation, according to an embodiment of the disclosure. In the disclosure, a neural network operation corresponding to each layer of a neural network may be referred to as an original operation, and a neural network operation performed by using channel-extended data may be referred to as a channel-extended neural network operation.

In operation S210, the electronic device 2000 performs a first modified operation of extending a channel of an output of a first layer with respect to a feature map input to the first layer from among layers of a deep neural network.

In some embodiments, a deep neural network that is an artificial neural network algorithm used in machine learning includes a plurality of layers. The deep neural network may include multiple hidden layers between an input layer and an output layer.

In some embodiments, when the electronic device 2000 performs a deep neural network operation, the electronic device 2000 may perform a modified operation capable of deriving the same operation result as an original operation. An original operation refers to an operation of a deep neural network model, determined according to an architecture and algorithm of the deep neural network model, without modifying the deep neural network model.

The first modified operation may be a space-to-depth transformation operation of extending a channel of an output of a first layer, while performing an operation corresponding to the first layer, with respect to the feature map input to the first layer from among the layers of the deep neural network. A space-to-depth transformation operation refers to rearranging space data into depth data. For example, a space-to-depth transformation operation may transform space data of a horizontal*vertical format into data of a horizontal*vertical*depth format, by rearranging data to extend to a depth dimension.

In some embodiments, the first layer may be an input layer that is a first layer from among the layers included in the deep neural network. Alternatively, the first layer may be a first layer from among hidden layers included in the deep neural network. Alternatively, the first layer may be any one layer from among the hidden layers included in the deep neural network.

The electronic device 2000, in some embodiments, may extend a channel of a neural network operation, by performing the first modified operation. Accordingly, the utilization efficiency of an operator (e.g., a multiply-accumulate (MAC) unit) of a hardware accelerator that performs the neural network operation may be improved.

In operation S220, the electronic device 2000 performs a neural network operation corresponding to layers between the first layer and a second layer, as a channel-extended neural network operation.

In some embodiments, the second layer may be a layer after the first layer in the deep neural network. For example, the second layer may be an output layer that is a last layer from among the layers included in the deep neural network. Alternatively, the second layer may be a last layer from among the hidden layers included in the deep neural network.

As a result of the first modified operation performed by the electronic device 2000, an output from the first layer may be a channel-extended output. In a specific example, a channel-extended output feature map may be output from the first layer. In this case, the channel-extended output feature map from the first layer may be input to a next layer. Accordingly, in the layers between the first layer and the second layer, a neural network operation corresponding to each layer may be performed as a channel-extended neural network operation. That is, a neural network operation may be sequentially performed in a channel-extended state.

As a result of the channel-extended neural network operation in the layers between the first layer and the second layer performed by the electronic device 2000, data input to the second layer may be a channel-extended feature map.

In operation S230, the electronic device 2000 performs a second modified operation of reducing a channel of an output of the second layer, with respect to the channel-extended feature map input to the second layer.

In some embodiments, the second modified operation may be a depth-to-space transformation operation of reducing a channel of an output of the second layer, while performing an operation corresponding to the second layer, with respect to the channel-extended feature map input to the second layer from among the layers of the deep neural network. A depth-to-space transformation operation refers to contracting and/or removing a depth dimension by rearranging depth data into space data.

As a result of the second modified operation performed by the electronic device 2000 according to an embodiment of the disclosure, an output from the second layer may be a channel-reduced output. In this case, the output from the second layer may be the same output as an original output of the second layer of the deep neural network, without the first modified operation, the channel-extended neural network operation, and the second modified operation.

In operation S240, the electronic device 2000 outputs an operation result of the deep neural network.

In some embodiments, the second layer may be an output layer of the deep neural network, and the second layer may be one of the hidden layers included in the deep neural network, an output layer may be located after the second layer, and one or more hidden layers and the output layer may be located after the second layer. When the electronic device 2000 obtains an output of the deep neural network from the second layer by performing the second modified operation or obtains an output of the deep neural network from an output layer located after the second layer, a deep neural network operation result obtained by the electronic device 2000 may be the same as an original operation result of the deep neural network. The original operation result refers to an original operation result of the deep neural network, without the first modified operation, the channel-extended neural network operation, and the second modified operation.

In some embodiments, an output of the deep neural network operation may vary according to a type of the deep neural network. For example, when a type of the deep neural network is a convolutional neural network and a model for object classification, an output of the deep neural network operation may be an object classification result (e.g., class probability).

Operations of FIG. 2 will be more clearly understood by referring to the drawings for describing each of the operations of FIG. 2.

Figure 3A:
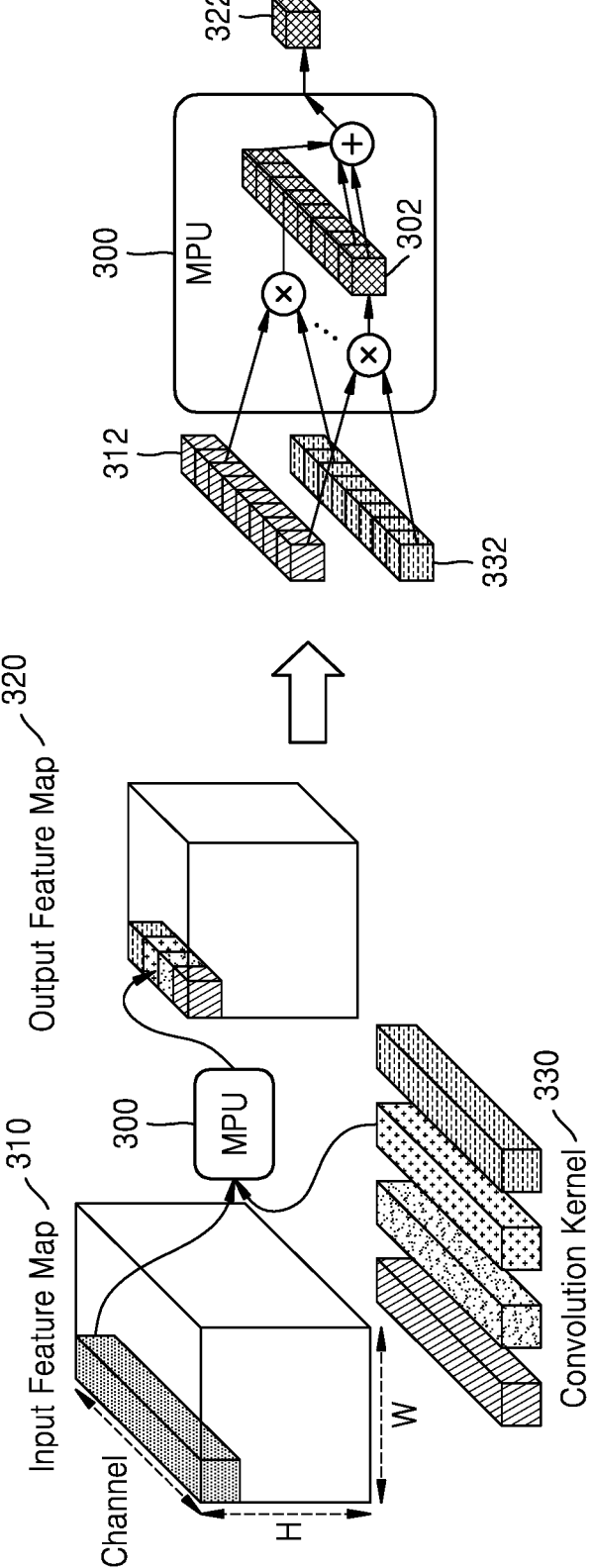
FIG. 3A is a diagram for describing an operation by which an electronic device performs a neural network operation by using a hardware accelerator, according to an embodiment of the disclosure.

FIG. 3A is a diagram for describing an operation by which an electronic device performs a neural network operation by using a hardware accelerator, according to an embodiment of the disclosure.

Figure 3B:
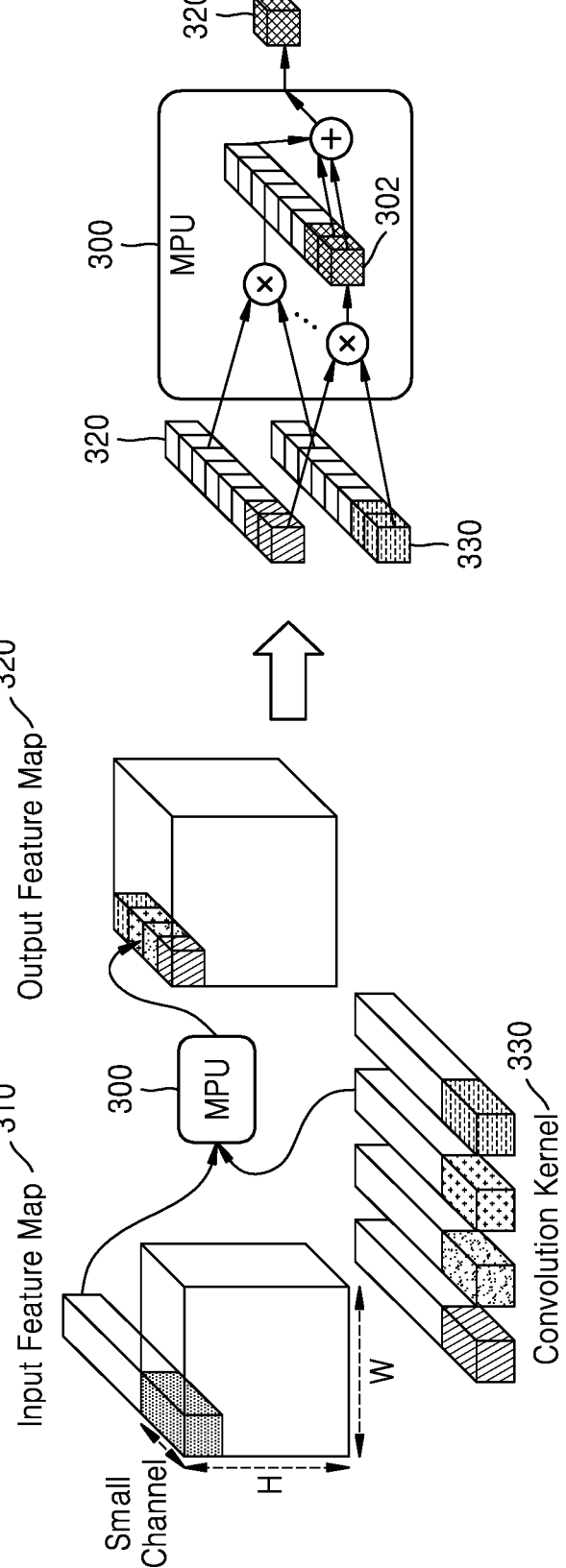
FIG. 3B is a diagram for further describing an operation by which an electronic device performs a neural network operation by using a hardware accelerator, according to an embodiment of the disclosure.

FIGS. 3A and 3B will be described assuming that a neural network operation is a convolution operation. However, a neural network operation of the disclosure is not limited to a convolution operation.

The electronic device 2000 according to an embodiment of the disclosure may include a hardware accelerator. Examples of the hardware accelerator may include, but are not limited to, a central processing unit (CPU), a graphics processing unit (GPU), a field-programmable gate array (FPGA), a system-on-chip (SoC), an application-specific integrated circuit (ASIC), a vision processing unit (VPC), and a neuromorphic integrated circuit (IC).

The accelerator of the electronic device 2000 may include a MAC unit 302 for processing a data operation. A set of MAC units 302 included in the electronic device 2000 may be referred to as a MAC processing unit (MPU) 300. However, the MPU 300 is a term selected for convenience of explanation, and is not limited as an element of the electronic device 2000.

Referring to FIG. 3A, the MPU 300 of the electronic device 2000 according to an embodiment of the disclosure outputs an output feature map 320, through a convolution operation of an input feature map 310 and a convolution kernel 330. In a more specific and intuitive example, an output feature value 322 may be obtained, by multiplying and adding feature values 312 included in an input feature map 310 and kernel values 332 included in the convolution kernel 330.

In some embodiments, the number of MAC units 302 of the MPU 300 may be determined according to specifications of the accelerator of the electronic device 2000. For example, when the number of MAC units 302 is N, N parallel operations may be performed in the MPU 300.

In the convolution operation of FIG. 3A, as many parallel operations as the number of channels of the input feature map 310 and the convolution kernel 330 are accumulated. In this case, when the number of channels is the same as the number of MAC units 302 of the MPU 300, all of the MAC units 302 of the MPU 300 may be used. When the number of channels is greater than the number of MAC units 302 of the MPU 300, as many operations as the number of MAC units 302 may be performed and the remaining channels may be subjected to remaining operations again and merged with a previous operation result. Accordingly, all of the MAC units 302 of the MPU 300 may be used.

However, in the case of an operation with respect to a feature map with a relatively small number of channels, all of the MAC units 302 of the MPU 300 may not be used, which will be further described with reference to FIG. 3B.

FIG. 3B is a diagram for further describing an operation by which an electronic device performs a neural network operation by using a hardware accelerator, according to an embodiment of the disclosure.

Referring to FIG. 3B, although a neural network operation may be a convolution operation like in FIG. 3A, channels of the input feature map 310 and the convolution kernel 330 may be less than channels of the input feature map 310 and the convolution kernel 330 in FIG. 3A. For example, the number of channels of the input feature map 310 and the convolution kernel 330 of FIG. 3B may be two, and the number of channels of the input feature map 310 and the convolution kernel 330 of FIG. 3A may be N, where N is greater than two.

A part of a convolution operation of the input feature map 310 and the convolution kernel 330 including two channels performed in the MPU 300 will be described in detail. A feature value of a first channel of the input feature map 310 is multiplied by a kernel value of a first channel of the convolution kernel, a feature value of a second channel of the input feature map 310 is multiplied by a kernel value of a second channel of the convolution kernel 330, results of the two multiplications are added, and the output feature value 322 is obtained. That is, because the input feature map 310 and the convolution kernel 330 include two channels, only two from among the MAC units 302 of the MPU 300 may be used in a meaningful operation. When this is generalized, in the case of a neural network operation with a small number of channels, the operation efficiency of the MPU 300 may be lowered. Because the electronic device 2000 may perform a channel transformation operation and a channel-extended neural network operation by applying an algorithm, the utilization efficiency of the MAC units 302 of the MPU 300 may be improved and operation efficiency may be improved.

Figure 4A:
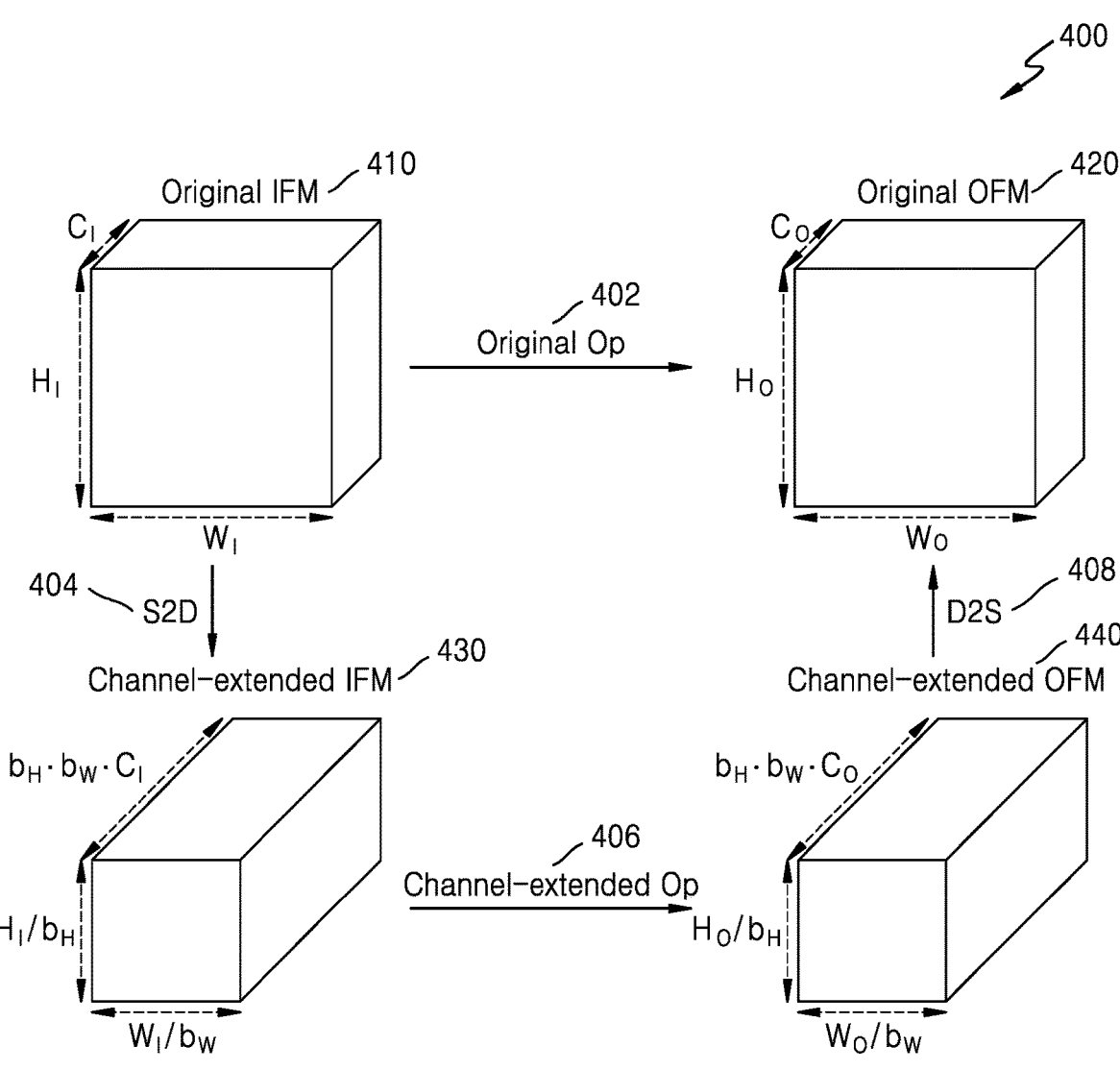
FIG. 4A is a diagram schematically illustrating an algorithm using which an electronic device performs a neural network operation, according to an embodiment of the disclosure.

FIG. 4A is a diagram schematically illustrating an algorithm using which an electronic device performs a neural network operation, according to an embodiment of the disclosure.

Referring to FIG. 4A, a block 400 for describing a part of a neural network operation of the electronic device 2000 according to an embodiment of the disclosure is illustrated. In the block 400, an original input feature map 410, an original output feature map 420, a channel-extended input feature map 430, and a channel-extended output feature map 440 are illustrated, and an operation relation between feature maps is illustrated.

In some embodiments, the original input feature map 410 may have a size of $H_I*W_I$, and the number of channels may be $C_I$.

In some embodiments, the electronic device 2000 may obtain the channel-extended input feature map 430 by performing a modified operation. The modified operation may be a space-to-depth transformation operation 404 of extending a channel. For example, the electronic device 2000 may obtain the channel-extended input feature map 430, generated by rearranging feature values of the original input feature map 410. The channel-extended input feature map 430 may have a size of $(H_I/B_H)*(W_I/B_W)$, and the number of channels may be $B_H*B_W*C_I$.

In some embodiments, the electronic device 2000 may perform a channel-extended neural network operation 406, by using the channel-extended input feature map 430, and may obtain the channel-extended output feature map 440. The channel-extended output feature map 440 may have a size of $(H_o/B_H)*(W_o/B_W)$, and the number of channels may be $B_H*B_W*C_o$.

In some embodiments, the electronic device 2000 may obtain the original output feature map 420 by performing another modified operation. The modified operation may be a depth-to-space transformation operation 408 of reducing a channel. For example, the electronic device 2000 may obtain the original output feature map 420, generated by rearranging feature values of the channel-extended output feature map 440. The original output feature map 420 may have a size of $H_O*W_O$, and the number of channels may be $C_O$.

In some embodiments, a result of the space-to-depth transformation operation 404, the channel-extended neural network operation 406, and the depth-to-space transformation operation 408 performed by the electronic device 2000 may be the same as a result of an original operation 402 of obtaining the original output feature map 420 from the original input feature map 410. However, in this case, even when the operation results are the same, because channels of a neural network operation are different according to an operation method, the number of MAC units used to obtain a meaningful value in an MPU may be different.

Figure 4B:
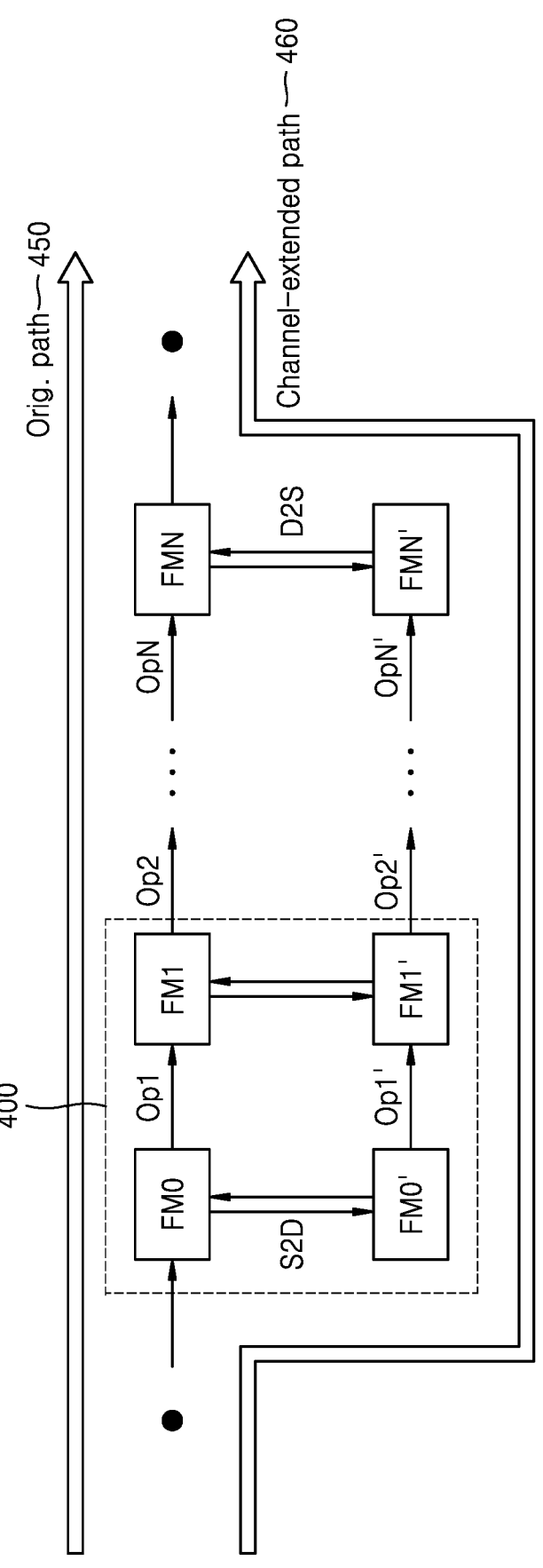
FIG. 4B is a diagram for describing an overall architecture of a neural network operation performed by an electronic device, according to an embodiment of the disclosure.

FIG. 4B is a diagram for describing an overall architecture of a neural network operation performed by an electronic device, according to an embodiment of the disclosure.

In FIG. 4B for further describing FIG. 4A, neural network operations according to an embodiment of the disclosure are sequentially performed. That is, in addition to the block 400 showing a neural network operation algorithm described with reference to FIG. 4A, neural network operations sequentially performed in a deep neural network model are further illustrated. In FIG. 4B, the block 400 may correspond to the block 400 of FIG. 4A. In detail, the block 400 of FIG. 4B includes a feature map 0 (FM0), a feature map 1 (FM1), a channel-extended feature map 0 (FM0'), and a channel-extended feature map 1 (FM1'), which are respectively generalized ones of the original input feature map 410, the original output feature map 420, the channel-extended input feature map 430, and the channel-extended output feature map 440 of FIG. 4A.

Referring to FIG. 4B, as a method of obtaining an operation result of a deep neural network operation, there may be an original path 450 and a channel-extended path 460. In an embodiment of the disclosure, an original neural network operation corresponding to each layer of a deep neural network model may be referred to as an original operation. In this case, the original path 450 is a path for obtaining an operation result of a deep neural network operation by sequentially performing original operations.

In some embodiments, a neural network operation performed by using channel-extended data may be referred to as a channel-extended neural network operation. In this case, the channel-extended path 460 is a path for obtaining an operation result of a deep neural network operation by sequentially performing a modified operation of extending a channel, a channel-extended neural network operation, and a modified operation of reducing a channel. That is, the electronic device 2000 may obtain the same result as an operation according to the original path 450 by performing an operation according to the channel-extended path 460. However, the channel-extended neural network operation is a term selected for convenience of explanation, and thus, the essence of the operation is not limited to the term.

In an example of FIG. 4B, operations of the original path 450 may include a first original operation Op1, a second original operation Op2, . . . , an $N-1^{th}$ original operation Op(N−1), and an $N^{th}$ original operation OpN. In this case, feature maps obtained in an operation process of the original path 450 are original feature maps in which a channel is not extended.

Also, operations of the channel-extended path 460 may include a first modified operation of extending a channel, channel-extended neural network operations (a first channel-extended operation Op1', a second channel-extended operation Op2', . . . , an $N-1^{th}$ channel-extended operation Op(N−1)', and an $N^{th}$ channel-extended operation OpN'), and a second modified operation of reducing a channel. In this case, feature maps obtained in a channel-extended neural network operation process of the channel-extended path 460 are channel-extended feature maps.

Figure 5A:
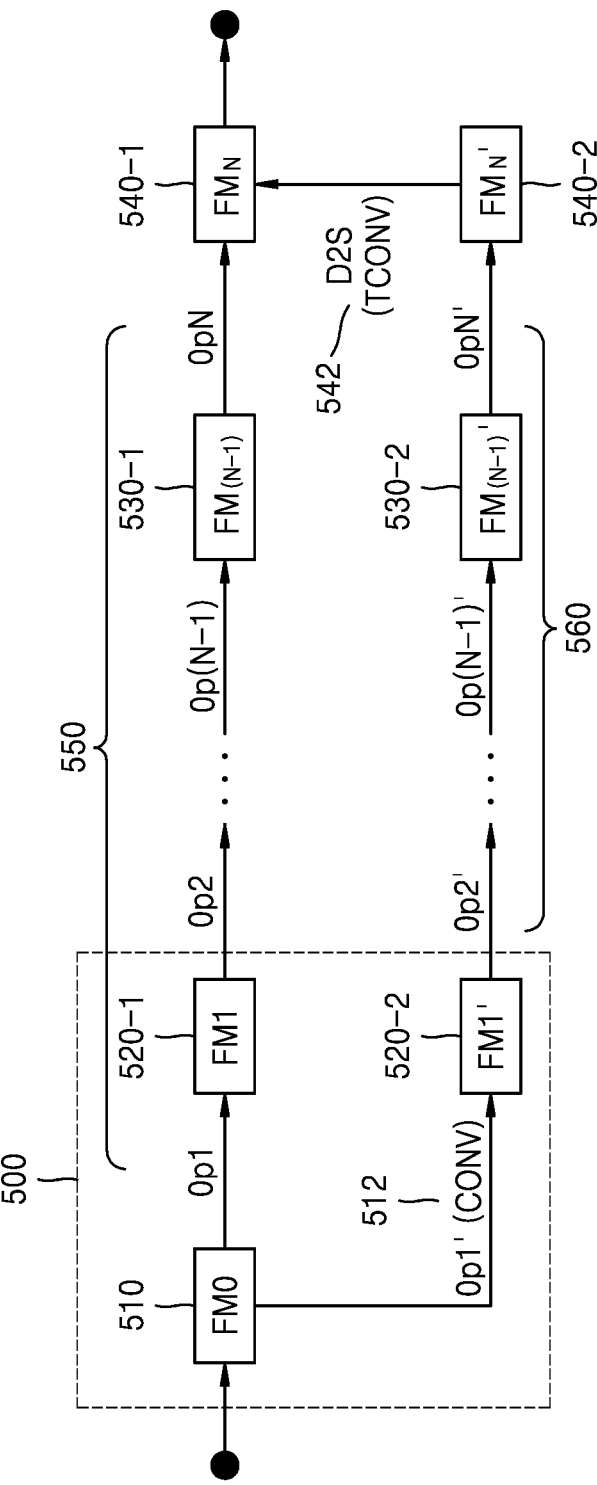
FIG. 5A is a diagram for describing an overall architecture of a neural network operation performed by an electronic device, according to an embodiment of the disclosure.

FIG. 5A is a diagram for describing an example of optimizing a neural network operation performed by an electronic device, according to an embodiment of the disclosure.

FIG. 5A through 5E will be described assuming that a neural network operation is a convolution operation. However, a neural network operation of the disclosure is not limited to a convolution operation. A convolutional neural network may include a convolution layer, a pooling layer, and a fully connected layer.

In some embodiments, the electronic device 2000 may apply various algorithms for optimizing operations included in the channel-extended path 460 described with reference to FIG. 4B.

In some embodiments, the electronic device 2000 may apply an optimization algorithm to a modified operation and/or a channel-extended neural network operation. First optimization, second optimization, third optimization, and fourth optimization will be described as examples of an optimization algorithm. However, optimization is not limited thereto, and may include all optimization methods derived or applicable from examples of the disclosure.

In a neural network operation of FIG. 5A, first optimization and fourth optimization are applied in an example of FIG. 4B. The first optimization and the fourth optimization will be briefly described first through an overall operation flow of FIG. 5A, and the remaining optimizations will be described again.

In some embodiments, the electronic device 2000 may apply first optimization 500. The first optimization 500 may obtain a performance gain by receiving an original feature map 0 (FM0) 510 as an input and directly outputting a channel-extended feature map 1 (FM1') 520-2. The channel-extended feature map 1 (FM1') 520-2 may be converted into an original feature map 1(FM1) 520-1 through depth-to-space transformation. Here, a modified operation of extending a channel from the original feature map 0 (FM0) 510 to a channel-extended feature map 0 (FM0') and a channel-extended neural network operation of obtaining the channel-extended feature map 1 (FM1') 520-2 from the channel-extended feature map 0 (FM0') may be performed as one optimized operation, which is referred to as an output channel-extended neural network operation in the disclosure. However, the term 'output channel-extended' is a term selected for convenience of explanation, and the essence of the operation is not limited to the term. A specific example of the first optimization 500 will be further described in the description of FIG. 5B.

In some embodiments, the electronic device 2000 may perform an output channel-extended neural network operation Op1' 512 on a feature map 0 (FM0) 510 input to a first layer from among layers of the convolutional neural network. As a result of the output channel-extended neural network operation, the channel-extended feature map 1 (FM1') 520-2 may be obtained.

In some embodiments, when the output channel-extended neural network operation 512 for the first optimization 500 is performed, the electronic device 2000 may perform subsequent neural network operations as a channel-extended neural network operation 560. The electronic device 2000 may perform a neural network operation corresponding to layers between the first layer and a second layer as the channel-extended neural network operation 560, to continuously input and output input/output data to neural network layers in a channel-extended state. For example, the channel-extended neural network operation 560 may include a second channel-extended operation Op2', . . . , an $N-1^{th}$ channel-extended operation Op(N−1)', and an $N^{th}$ channel-extended operation OpN'. Feature maps obtained in the channel-extended neural network operation 560 are channel-extended feature maps. For example, a channel-extended feature map N−1 ($FM_{(N-1)}$') 530-2 and a channel-extended feature map N ($FM_N$') 540-2 may be channel-extended feature maps.

In some embodiments, the electronic device 2000 may perform a second modified operation 542, on the channel-extended feature map N (FM$_N$') 540-2 input to the second layer from among the layers of the convolutional neural network. The second modified operation 542 may be a depth-to-space transformation operation of reducing a channel of an output of the second layer. As a result of the second modified operation 542, an original feature map N (FM$_N$) 540-1 in which a channel is reduced may be obtained. In this case, the obtained original feature map N 540-1 is the same as a result of an original operation 550 of the convolutional neural network. For example, the original operation 550 may include a first original operation Op1, a second original operation Op2, . . . , an N–1$^{th}$ original operation Op(N–1), and an original N$^{th}$ operation OpN. In this case, feature maps obtained in the original operation 550 may be original feature maps in which a channel is not extended.

In some embodiments, when the original feature map N 540-1 is obtained, the electronic device 2000 may output a result of the neural network operation. In an embodiment of the disclosure, the result of the neural network operation may include a feature value and/or an inference result. For example, a feature value that is a result of the neural network according to the above method may be further subjected to a neural network operation through another layer after the second layer, and an inference result of a neural network model may be output based on a result of the neural network operation. In detail, because a convolutional neural network is illustrated in FIG. 5A, the electronic device 2000 may pass feature values of the original feature map N 540-1 through fully connected layers to output an image classification result.

The electronic device 2000 may replace the first and/or second modified operation with another operation, based on a type of a deep neural network. For example, when the deep neural network is a convolutional neural network, the electronic device 2000 may replace the first modified operation 520 including a space-to-depth transformation operation with a convolution operation. That is, the electronic device 2000 may apply third optimization. In the case of a convolutional neural network, the third optimization may obtain a channel-extended feature map by applying a convolution operation method. Also, the electronic device 2000 may replace the second modified operation 542 including a depth-to-space transformation operation with a transposed convolution operation. That is, the electronic device 2000 may apply fourth optimization, and in the case of a convolutional neural network, the fourth optimization may obtain a channel-reduced feature map by applying a transposed convolution operation method, which will be further described below.

Because the electronic device 2000 may select and apply a modified operation corresponding to a type of a deep neural network, the operation efficiency of the electronic device 2000 may be further improved. For example, when a convolution operation (third optimization) is used to extend a channel and a transposed convolution operation (fourth optimization) is used to reduce a channel, the utilization efficiency of MAC units of an accelerator may be improved as parallel operations are performed.

The first optimization 500 will be further described with reference to FIGS. 5B and 5C, and second optimization will be further described with reference to FIGS. 5D and 5E.

In some embodiments, the electronic device 2000 may reduce overhead of an operation, by using third optimization and fourth optimization.

In some embodiments, the third optimization may include applying a convolution operation method to a first modified operation. As described above, the first modified operation may include a space-to-depth transformation operation, and the space-to-depth transformation operation may be replaced with equivalent two-dimensional (2D) convolution. The space-to-depth transformation operation is an operation of changing the order of data stored in a memory (e.g., a random-access memory (RAM)). Because the space-to-depth transformation operation is not generally an operation such as convolution or activation optimized for a deep neural network accelerator, the operation is not performed with optimized efficiency in the deep neural network accelerator. The electronic device 2000 may use the third optimization that applies the convolution operation method to the first modified operation, to reduce overhead of an operation while obtaining the same result as the first modified operation with a convolution operation that may be rapidly performed in the deep neural network accelerator.

In some embodiments, the fourth optimization may include applying a transposed convolution operation method to a second modified operation. As described above, the second modified operation may include a depth-to-space transformation operation, and the depth-to-space transformation operation may be replaced with equivalent 2D transposed convolution. The depth-to-space transformation operation is also an operation of changing then order of data stored in the memory (e.g., the RAM). The electronic device 2000 may use the fourth optimization that applies the transposed convolution operation method to the second modified operation 542, to reduce overhead of an operation while obtaining the same result as the second modified operation 542 with a transposed convolution operation that may be rapidly performed in the deep neural network accelerator.

Although the first optimization and the fourth optimization are shown in FIG. 5A, optimization of a deep neural network operation of the electronic device 2000 is not limited thereto. The electronic device 2000 may selectively apply any combination of the first optimization to the fourth optimization. For example, in an example of FIG. 5A, instead of performing the second modified operation 542, the second optimization may be applied, to directly obtain the original feature map 540-1 from the channel-extended feature map N–1 (FM$_{(N-1)}$') 530-2.

Figure 5B:
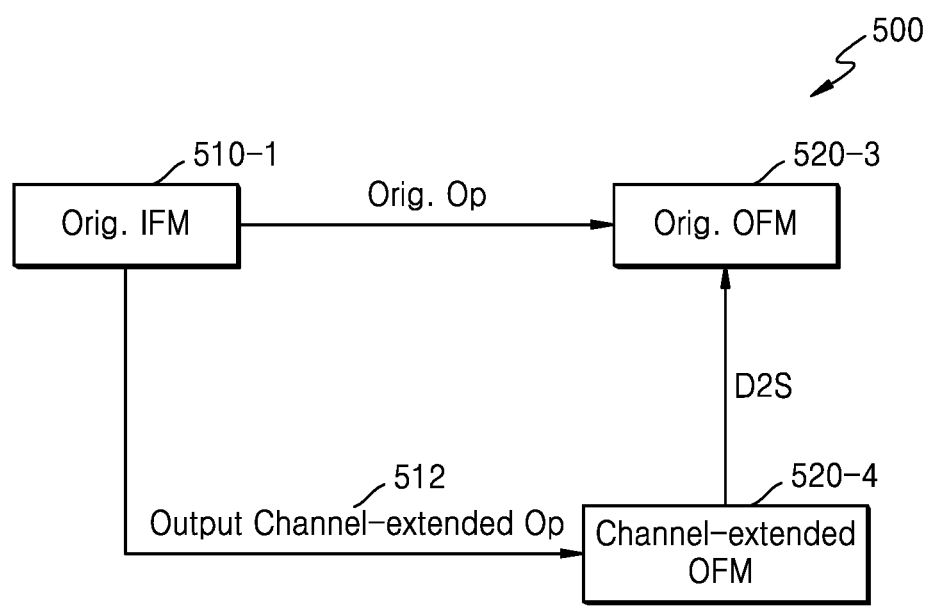
FIG. 5B is a diagram for describing an optimization operation of outputting a channel-extended feature map, performed by an electronic device, according to an embodiment of the disclosure.

FIG. 5B is a diagram for describing an optimization operation of outputting a channel-extended feature map, performed by an electronic device, according to an embodiment of the disclosure. Referring to FIG. 5B, only the first optimization 500 in a deep neural network operation of FIG. 5A is generalized and illustrated.

In some embodiments, when the electronic device 2000 performs an original neural network operation on an original input feature map 510-1, an original output feature map 520-3 may be obtained.

In some embodiments, when the electronic device 2000 performs an output channel-extended neural network operation 512 on the original input feature map 510-1, a channel-extended output feature map 520-4 may be obtained. The original output feature map 520-3 and the channel-extended output feature map 520-4 may be mutually converted through a space-to-depth transformation operation or a depth-to-space transformation operation.

When the electronic device 2000 performs the output channel-extended neural network operation 512 on the original input feature map 510-1, the channel-extended output feature map 520-4 may be obtained, and thus, the output channel-extended neural network operation 512 may include a function of a space-to-depth transformation operation. Also, because the channel-extended output feature map 520-4 may be obtained by using the original input feature map 510-1 (i.e., to obtain the same value as an original operation), the output channel-extended neural network operation 512 may include a function of a neural network operation (e.g., a convolution operation or an element-wise operation) corresponding to a neural network layer.

In some embodiments, the electronic device 2000 may apply the output channel-extended neural network operation 512, to directly obtain the channel-extended output feature map 520-4 without space-to-depth transformation, thereby reducing overhead of an operation and optimizing a neural network operation.

Figure 5C:
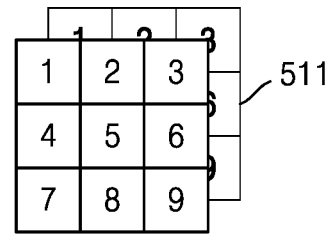
FIG. 5C is a diagram for describing a specific example of FIG. 5B.

FIG. 5C is a diagram for describing a specific example of FIG. 5B.

In some embodiments, when a neural network operation is a convolution operation, the electronic device 2000 may obtain a modified kernel (hereinafter, referred to as a second kernel) 513 by modifying an original kernel (hereinafter, referred to as a first kernel) 511. The first kernel 511 may be a kernel of an existing trained neural network model, and the second kernel 513 may be a kernel for obtaining the channel-extended output feature map 520-4, while obtaining the same value as an original convolution operation with respect to the original input feature map 510-1.

In this case, a relationship between the first kernel 511 and the second kernel 513 may be expressed as in an equation of FIG. 5C. Specific derivation of the equation of FIG. 5C is as follows.

Given,

IFM depth: $D_i$

Original OFM depth: $D_o$

OFM S2D's block size: $B_h$, $B_w$ (height and width respectively)

Original convolution:

Stride: $STR_{h1}$, $STR_{w1}$

Padding: $PAD_{t1}$, $PAD_{b1}$, $PAD_{l1}$, $PAD_{r1}$ (top, bottom, left and right respectively)

Kernel size: $K_{h1}$, $K_{w1}$

Kernel data: $KER_1$ as 4D tensor in shape of $[K_{h1}, K_{w1}, D_i, D_o]$

Output channel extended convolution can be set as following:

Stride: $STR_{h2}$, $STR_{w2}$ where $STR_{h2}=STR_{h1}B_h$, $STR_{w2}=STR_{w1}B_w$ Padding: $PAD_{t2}$, $PAD_{b2}$, $PAD_{l2}$, $PAD_{r2}$ where $PAD_{t2}=PAD_{t1}$, $PAD_{b2}=PAD_{b1}$, $PAD_{l2}=PAD_{l1}$, $PAD_{r2}=PAD_{r1}$ Kernel size: $K_{h2}$, $K_{w2}$ where $K_{h2}=K_{h1}+STR_{h1}(B_h-1)$, $K_{w2}=K_{w1}+STR_{w1}(B_w-1)$ Kernel data: $KER_2$ as 4D tensor in shape of $$[K_{h2}, K_{w2}, D_i, D_oB_hB_w]$$

$$KER_2\begin{pmatrix} k_{h1}+STR_{h1}b_h, \\ k_{w1}+STR_{w1}b_w, \\ d_i, \\ d_o+D_o(b_w+B_wb_h) \end{pmatrix} = KER_1(k_{h1}, k_{w1}, d_i, d_o)$$

Where $k_{h1} \in [0,K_{h1})$, $k_{w1} \in [0,K_{w1})$, $d_i \in [0,D_i)$, $d_o \in [0,D_o)$, $b_h \in [0,B_h)$, $b_w \in [0,B_w)$, And, $KER_2$(otherwise)=0

Figure 5D:
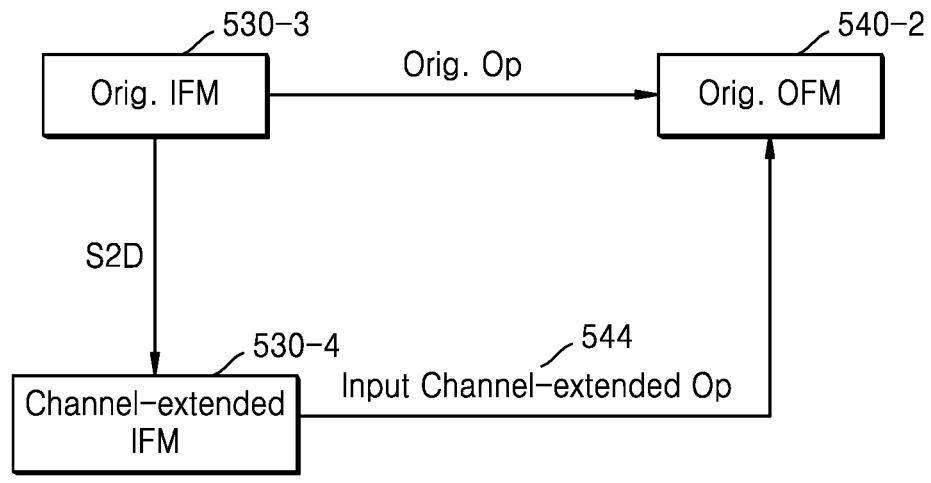
FIG. 5D is a diagram for describing an optimization operation of receiving a channel-extended feature map as an input, performed by an electronic device, according to an embodiment of the disclosure.

FIG. 5D is a diagram for describing an optimization operation of receiving a channel-extended feature map as an input, performed by an electronic device, according to an embodiment of the disclosure.

Referring to FIG. 5D, second optimization that performs a function similar to that of the first optimization 500 described in the above embodiments is generalized and illustrated.

Second optimization 500 may obtain a performance gain by receiving a channel-extended input feature map 530-4 as an input and directly outputting an original output feature map 540-2. The channel-extended input feature map 530-4 may be converted into an original input feature map 530-3 through space-to-depth transformation. Here, a channel-extended neural network operation of obtaining a channel-extended output feature map from the channel-extended input feature map 530-4 and a modified operation of reducing a channel from the channel-extended output feature map to the original output feature map 540-2 may be performed as one optimized operation, which is referred to as an input channel-extended neural network operation in the disclosure. However, the term 'input channel-extended neural network operation' is a term selected for convenience of explanation, and the essence of the operation is not limited to the term.

In some embodiments, when the electronic device 2000 performs an original neural network operation on the original input feature map 530-3, the original output feature map 540-2 may be obtained. The original input feature map 530-3 and the channel-extended input feature map 530-4 may be mutually converted through a space-to-depth transformation operation or a depth-to-space transformation operation.

When the electronic device 2000 performs an input channel-extended neural network operation 544 on the channel-extended input feature map 530-4, the original output feature map 540-2 may be obtained, and thus, the input channel-extended neural network operation 544 may include a function of a depth-to-space transformation operation. Also, because the original output feature map 540-2 is obtained by using the channel-extended input feature map 530-4 (i.e., to obtain the same value as an original operation), the modified operation may include a function of a neural network operation (e.g., a convolution operation or an element-wise operation) corresponding to a neural network layer.

In some embodiments, the electronic device 2000 may apply the input channel-extended neural network operation 544, to directly obtain the original output feature map 540-2 without depth-to-space transformation, thereby reducing overhead of an operation and optimizing a neural network operation.

FIG. 5E is a diagram for describing a specific example of FIG. 5D.

In some embodiments, when a neural network operation is a convolution operation, the electronic device 2000 may obtain a modified kernel (hereinafter, referred to as a second kernel) 513 by modifying an original kernel (hereinafter, referred to as a first kernel) 511. The first kernel 511 may be a kernel of an existing trained neural network model, and the second kernel 513 may be a kernel for obtaining the original output feature map 540-2, while obtaining the same value as an original convolution operation with respect to the channel-extended input feature map 530-4.

In this case, a relationship between the first kernel 511 and the second kernel 513 may be expressed as in an equation of FIG. 5E. Specific derivation of the equation of FIG. 5E is as follows.

Given,

Original IFM depth: $D_i$

IFM S2D's block size: $B_h$, $B_w$ (height and width respectively)

OFM depth: $D_o$

Original convolution:

Stride: $STR_{h1}$, $STR_{w1}$

Padding: $PAD_{t1}$, $PAD_{b1}$, $PAD_{l1}$, $PAD_{r1}$ (top, bottom, left and right respectively)

Kernel size: $K_{h1}$, $K_{w1}$

Kernel data: $KER_1$ as 4D tensor in shape of $[K_{h1}, K_{w1}, D_i, D_o]$ (Requirement) Input channel extension for convolution can only be found when:

$B_h$ divides $STR_{h1}$ $B_w$ divides $STR_{w1}$

Input channel extended convolution can be set as following:

Stride: $STR_{h2}$, $STR_{w2}$ where $STR_{h2}=STR_{h1}/B_h$, $STR_{w2}=STR_{w1}/B_w$ Padding: $PAD_{t2}$, $PAD_{b2}$, $PAD_{l2}$, $PAD_{r2}$ where $$PAD_{t2} = \left\lceil \frac{PAD_{t1}}{B_h} \right\rceil,$$

$$PAD_{b2} = \left\lceil \frac{PAD_{b1}}{B_h} \right\rceil,$$

$$PAD_{l2} = \left\lceil \frac{PAD_{l1}}{B_w} \right\rceil,$$

$$PAD_{r2} = \left\lceil \frac{PAD_{r1}}{B_w} \right\rceil$$

Kernel size: $K_{h2}$, $K_{w2}$ where $$K_{h2} = \left\lfloor \frac{K_{h1} - 1 - PAD_{t1}}{B_h} \right\rfloor - \left\lfloor \frac{-PAD_{t1}}{B_h} \right\rfloor + 1,$$

$$K_{w2} = \left\lfloor \frac{K_{w1} - 1 - PAD_{l1}}{B_w} \right\rfloor - \left\lfloor \frac{-PAD_{l1}}{B_w} \right\rfloor + 1$$

Kernel data: $KER_2$ as 4D tensor in shape of $[K_{h2}, K_{w2}, D_i B_h B_w, D_o]$ $$KER_2 \left( \begin{array}{c} \left\lfloor \frac{k_{h1} - PAD_{t1}}{B_h} \right\rfloor - \left\lfloor \frac{-PAD_{t1}}{B_h} \right\rfloor, \\ \left\lfloor \frac{k_{w1} - PAD_{l1}}{B_w} \right\rfloor - \left\lfloor \frac{-PAD_{l1}}{B_w} \right\rfloor, \\ d_i + D_i \left( r\left( \frac{k_{w1} - PAD_{l2}}{B_w} \right) + B_w r\left( \frac{K_{h1} - PAD_{t1}}{B_h} \right) \right), \\ d_o \end{array} \right) =$$

$$KER_1(k_{h1}, k_{w1}, d_i, d_0)$$

Wherein, $k_{h1} \in [0, K_{h1})$, $k_{w1} \in [0, K_{w1})$, $d_i \in [0, D_1)$, $d_o \in [0, D_o)$, $$r\left( \frac{P}{Q} \right)$$

is expression for the least non-negative remainder of division $P \div Q$,

And, $KER_2$(otherwise)=0

Figure 6:
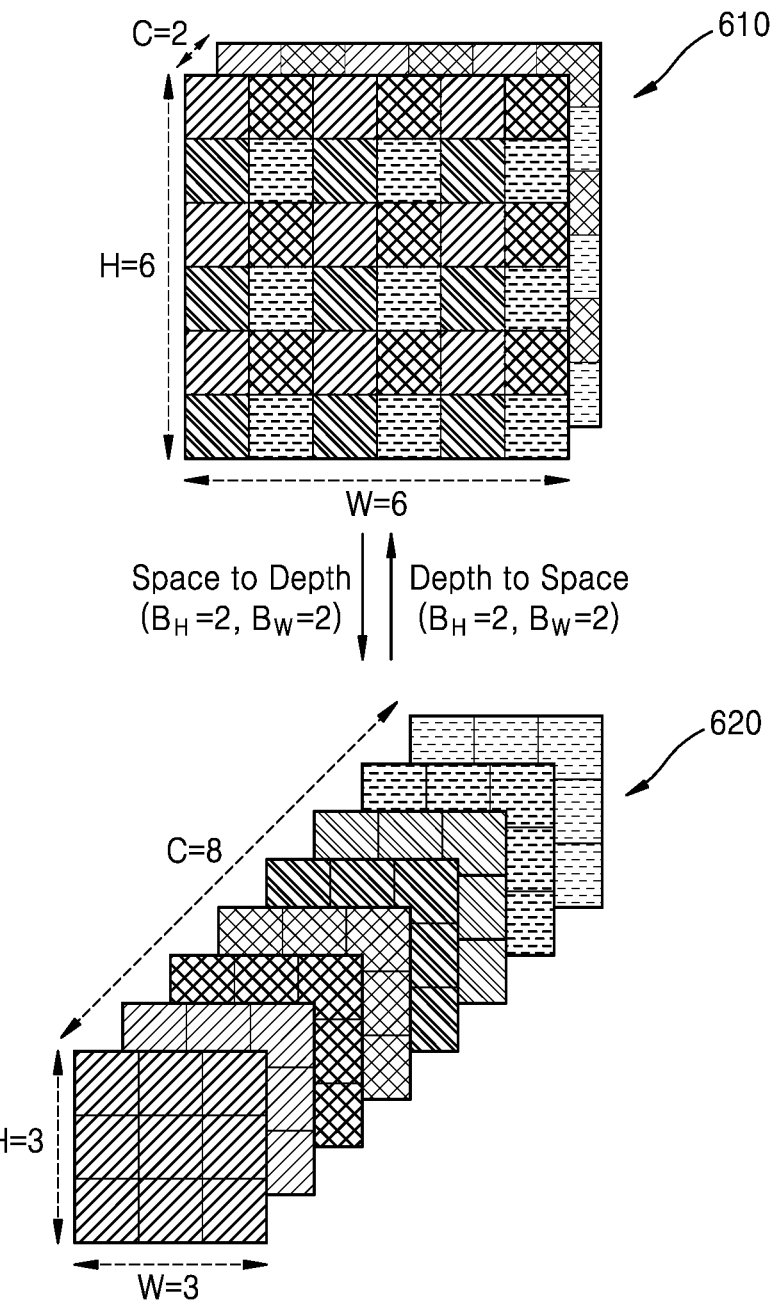
FIG. 6 is a diagram for describing first modification and second modification of a neural network operation, according to an embodiment of the disclosure.

FIG. 6 is a diagram for describing first modification and second modification of a neural network operation, according to an embodiment of the disclosure.

In some embodiments, the electronic device 2000 may perform a modified operation of rearranging data on a feature map. The modified operation may include a space-to-depth transformation operation of extending a channel and a depth-to-space transformation operation of reducing a channel.

For example, an original feature map 610 may have a size of H*W, and the number of channels may be C. When the electronic device 2000 is to extend a channel of the original feature map 610 by $B_H*B_W$ by performing space-to-depth transformation, the electronic device 2000 may select adjacent $B_H*B_W$ feature values in the original feature map 610 and may arrange the feature values in a channel direction of a single pixel. In this case, the original feature map 610 with a dimension of (H,W,C) may be modified into a channel-extended feature map 620 with a dimension of (H/$B_H$, W/$B_W$, C*$B_H$*$B_W$). In contrast, when the electronic device 2000 is to reduce a channel of the feature map by $B_H*B_W$ by performing depth-to-space transformation, the electronic device 2000 may select $B_H*B_W$ feature values arranged in a channel direction of a single pixel of the channel-extended feature map 620, and may arrange the feature values to become adjacent $B_H*B_W$ pixels in the original feature map 610. In this case, the channel-extended feature map 620 with the dimension of (H/$B_H$, W/$B_W$, C*$B_H$*$B_W$) may be modified into the original feature map 610 with the dimension of (H,W,C).

Referring to FIG. 6, the original feature map 610 with a dimension of (6, 6, 2) may be modified into the channel-extended feature map 620 with a dimension of (3, 3, 8) through space-to-depth transformation, and the channel-extended feature map 620 may be modified into the original feature map 610 through depth-to-space transformation which is reverse modification.

Figure 7:
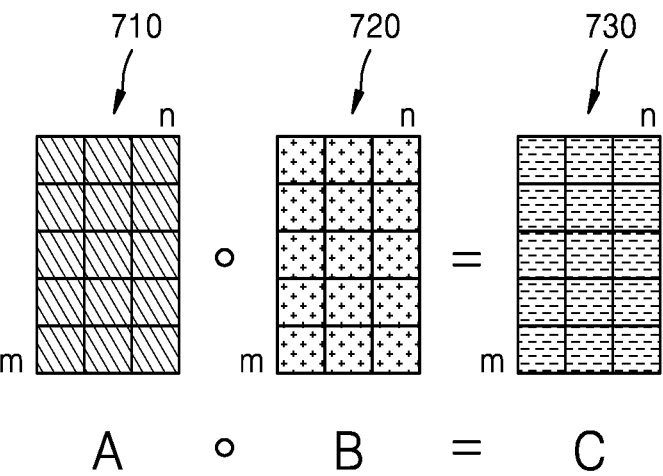
FIG. 7 is a diagram for describing an example of a deep neural network operation performed by an electronic device, according to an embodiment of the disclosure.

FIG. 7 is a diagram for describing an example of a deep neural network operation performed by an electronic device, according to an embodiment of the disclosure.

In some embodiments, a neural network operation may be an element-wise operation (e.g., element-wise multiplication). An element-wise operation has input/output feature maps having the same size, and one feature value in the output feature map depends on a feature value at the same position in the input feature maps. For example, an element-wise operation of a first feature map 710 and a second feature map 720 may be performed to obtain a third feature map 730.

The electronic device 2000 according to an embodiment of the disclosure performs a first modified operation on a feature map input to a first layer from among layers of a deep neural network. The electronic device 2000 may perform an operation corresponding to the first layer on the feature map input to the first layer, but may allow a channel of an output of the first layer to be extended.

For example, when the first layer is a layer for an element-wise operation, the electronic device 2000 may rearrange space data of the first feature map 710 and the second feature map 720 in a depth direction. The electronic device 2000 may extend a channel by rearranging feature values of the first feature map 710 and the second feature map 720, and then may obtain channel-extended data that is a result of the element-wise operation. The channel-extended data may be rearrangement of feature values of the third feature map 730, and may be a result of extending a channel of the third feature map 730 in the same method as extending the channel of the first feature map 710 and the second feature map 720.

In some embodiments, the electronic device 2000 may perform a channel-extended neural network operation by using the channel-extended data as input/output data, which has been described above, and thus, a repeated description will be omitted.

Although FIG. 7 is described assuming that an example of a neural network operation is an element-wise operation, a type of a neural network operation is not limited thereto.

Figure 8A:
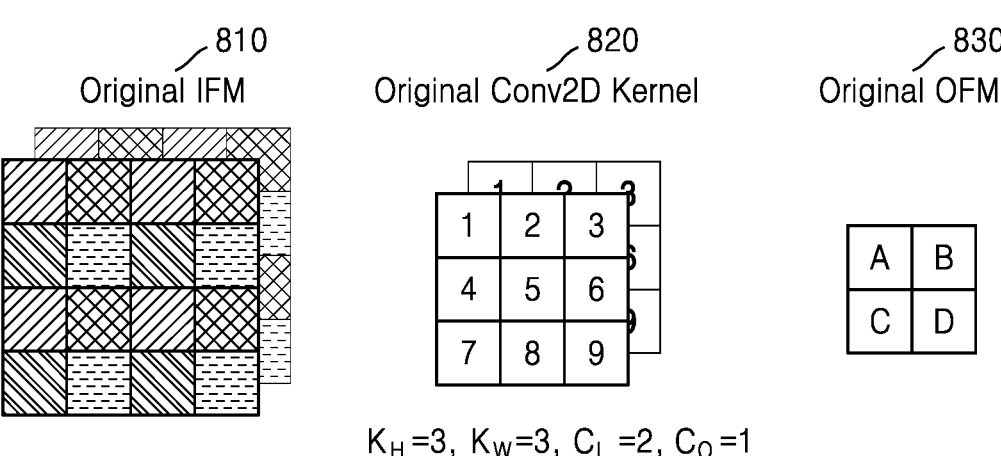
Figure 8B:
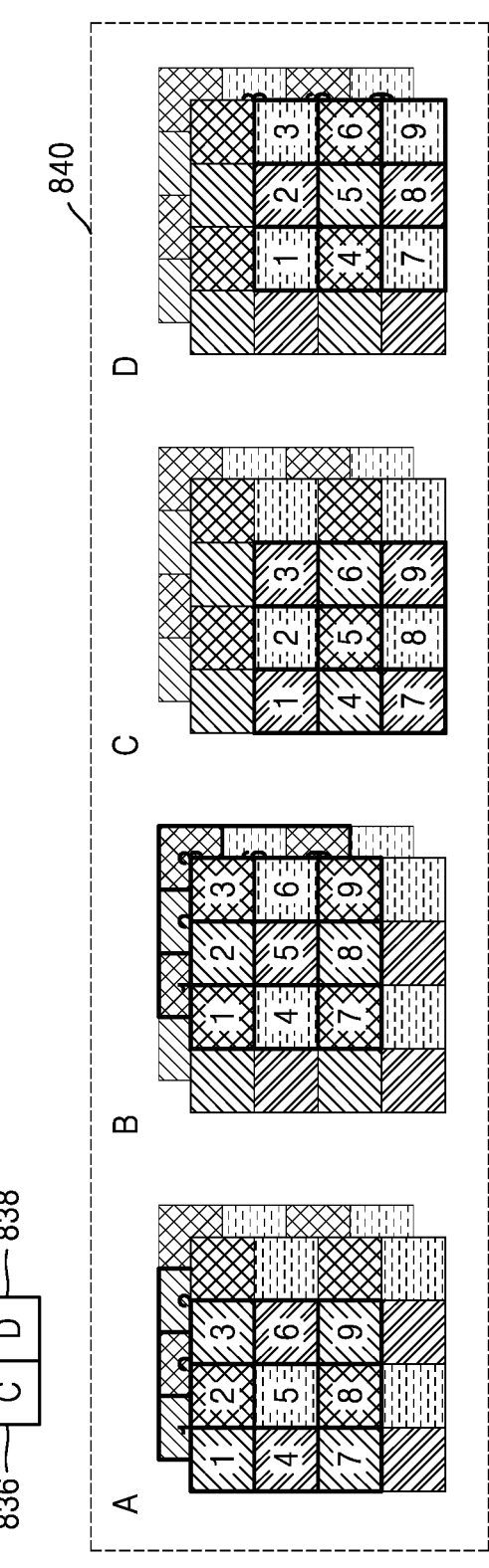
Figure 8C:
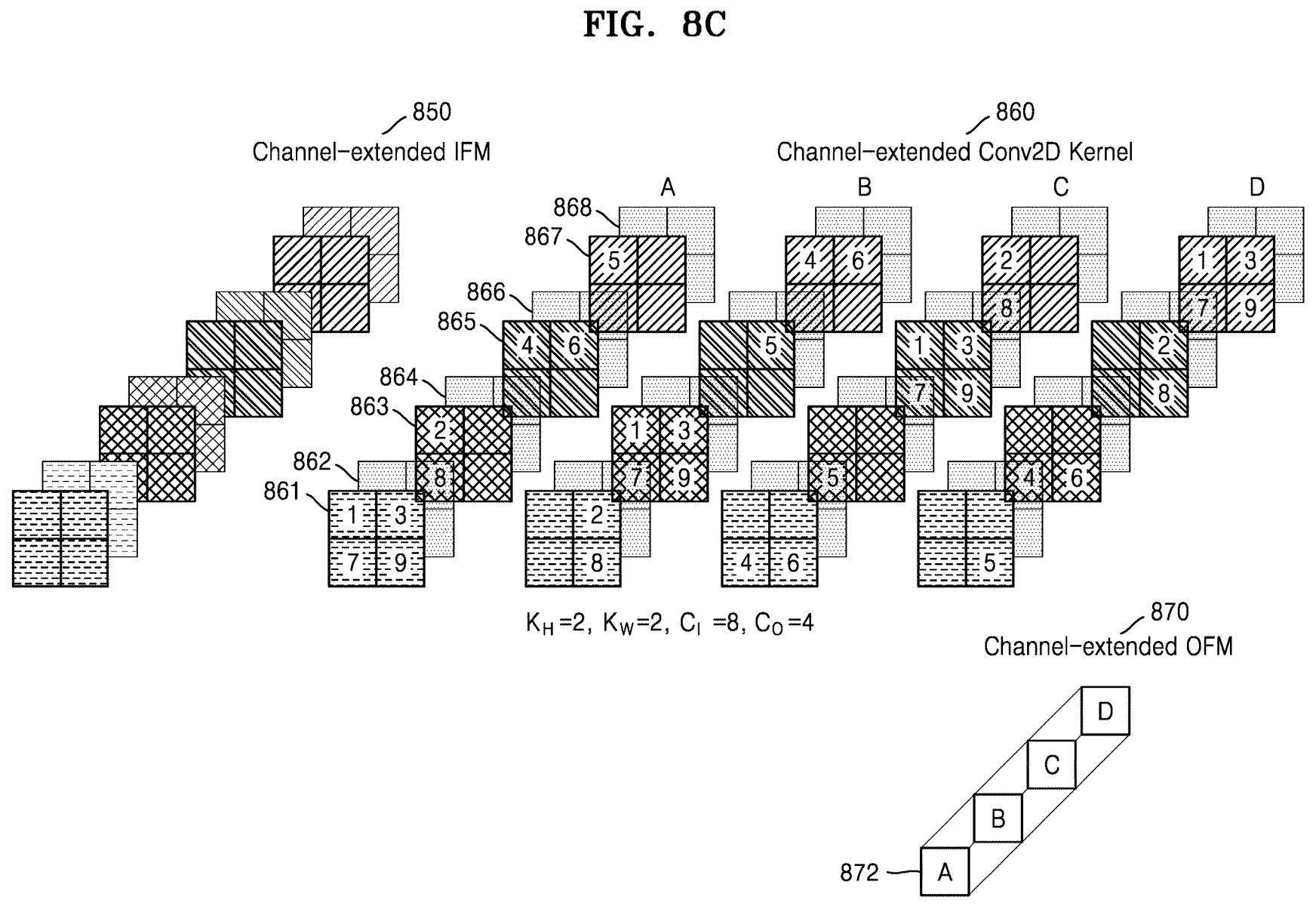

FIGS. 8A through 8C are diagrams for describing an example where a deep neural network operation performed by an electronic device is a convolution operation, according to an embodiment of the disclosure.

FIG. 8A is a diagram for describing an original convolution operation.

In some embodiments, a neural network operation may be a convolution operation. In FIG. 8A, a convolution operation, which may be an original operation, will be briefly described.

In some embodiments, an original kernel 820 strides with respect to an original input feature map 810 to obtain an original output feature map 830. For example, a size of the original input feature map 710 may be $H_I*W_I=4*4$, a size of the original kernel 820 may be $K_H*K_W=3*3$, a channel of the original input feature map 810 and the original kernel 820 may be $C_I=2$, a size of the original output feature map 830 may be $H_O*W_O=2*2$, and a channel of the original output feature map 830 may be $C_O=1$.

FIG. 8B is a diagram for further describing an original convolution operation.

In some embodiments, the original output feature map 830 may include a feature value A 832, a feature value B 834, a feature value C 836, and a feature value D 838.

In some embodiments, in order to denote feature value elements of the original input feature map 810 with a size of 4*4, a matrix representation method may be introduced. In detail, a feature value element of a channel 1 of the original input feature map 810 is described as a matrix element $A_{ij}$, and a feature value element of a channel 2 of the input feature map 810 is described as a matrix element $B_{ij}$. Also, padding=0 and stride=1 is applied as an example, and a specific convolution operation is obvious to one of ordinary skill in the art, and thus, will be briefly described.

In some embodiments, the feature value 832 of the original output feature map 830 may be obtained by adding an element-wise multiplication result of feature values $A_{11}$, $A_{12}$, $A_{13}$, $A_{21}$, $A_{22}$, $A_{23}$, $A_{31}$, $A_{32}$, $A_{33}$ and kernel values 1, 2, 3, 4, 5, 6, 7, 8, 9 of the original input feature map 810, and an element-wise multiplication result of feature values $B_{11}$, $B_{12}$, $B_{13}$, $B_{21}$, $B_{22}$, $B_{23}$, $B_{31}$, $B_{32}$, $B_{33}$ and kernel values 1, 2, 3, 4, 5, 6, 7, 8, 9 of the original input feature map 810.

In some embodiments, the feature value B 834 of the original output feature map 830 may be obtained by adding an element-wise multiplication result of feature values $A_{12}$, $A_{13}$, $A_{14}$, $A_{22}$, $A_{23}$, $A_{24}$, $A_{32}$, $A_{33}$, $A_{34}$ and kernel values 1, 2, 3, 4, 5, 6, 7, 8, 9 of the original input feature map 810, and an element-wise multiplication result of feature values $B_{12}$, $B_{13}$, $B_{14}$, $B_{22}$, $B_{23}$, $B_{24}$, $B_{32}$, $B_{33}$, $B_{34}$ and kernel values 1, 2, 3, 4, 5, 6, 7, 8, 9 of the original input feature map 810.

In the same manner, the feature value C 836 and the feature value D 838 of the original output feature map 830 may be obtained. That is, an original operation is performed as the original kernel 820 strides over the original input feature map 810 as shown in block 840.

The electronic device 2000 according to an embodiment of the disclosure performs a modified operation and channel-extended neural network operation, which may obtain the same effect as the original operation. That is, the electronic device 2000 may extend the number of channels of calculated data, by performing a neural network operation method according to the above embodiments of the disclosure, and may obtain the same result as the original operation, which will be further described with reference to FIG. 8C.

FIG. 8C is a diagram for describing that an electronic device extends a channel of a feature map to perform a convolution operation, according to an embodiment of the disclosure.

The electronic device 2000 according to an embodiment of the disclosure may perform a first modified operation, to extend a channel of an output of a layer of a convolutional neural network. The first modified operation may include a space-to-depth transformation operation of extending a channel of a feature map. Also, the first modified operation may include a kernel transformation operation of modifying a kernel of a convolutional neural network. Also, the first modified operation may include applying a convolution operation method. For example, the electronic device 2000 may obtain a channel-extended output feature map 870 by applying a convolution operation method, based on a channel-extended feature map 850 and a channel-extended kernel 860.

In some embodiments, the electronic device 2000 may obtain the channel-extended input feature map 850 by performing a space-to-depth transformation operation on the original input feature map 810. An example where the electronic device 2000 performs a space-to-depth transformation operation has been described with reference to FIG. 6, and thus, a repeated description will be omitted.

In some embodiments, the electronic device 2000 may obtain the channel-extended kernel 860 by performing a kernel transformation operation. The channel-extended kernel 860 may be obtained by rearranging kernel values of the original kernel 820.

For convenience of explanation, a kernel A1 861, a kernel A2 862, a kernel A3 863, a kernel A4 864, a kernel A5 865, a kernel A6 866, a kernel A7 867, and a kernel A8 868 (which are some of the channel-extended kernels, for obtaining a feature value A 872 of the channel-extended output feature map 870) will be representatively described. One of ordinary skill in the art would clearly understand a method of obtaining a feature value B, a feature value C, and a feature value D of the channel-extended feature map 870 as seen in FIG. 8C by analogizing the below described method of obtaining the feature value A 872.

In some embodiments, in order to denote kernel value elements of the kernel A1 861 through the kernel A8 868 with a size of 2*2, a matrix representation method is introduced.

In some embodiments, the electronic device 2000 may rearrange kernel values 1, 3, 7, 9 (herein, values are numbers indicating positions and not actual values) of a channel 1 of the original kernel 820 as $A1_{11}$, $A1_{12}$, $A1_{21}$, $A1_{22}$ of the kernel A1 861. In the same manner, the electronic device 2000 may rearrange kernel values 1, 3, 7, 9 of a channel 2 of the original kernel 820 as $A2_{11}$, $A2_{12}$, $A2_{21}$, $A2_{22}$ of the kernel A2 862.

Also, the electronic device 2000 may rearrange kernel values 2, 8 of the channel 1 of the original kernel 820 as $A3_{11}$, $A3_{21}$ of the kernel A3 863, and pads 0 to the remaining values $A3_{12}$, $A3_{22}$. In the same manner, the electronic device 2000 may rearrange kernel values 2, 8 of the channel 2 of the original kernel 820 as $A4_{11}$, $A4_{21}$ of the kernel A4 864, and pads 0 to the remaining values $A4_{12}$, $A4_{22}$.

Also, the electronic device 2000 may rearrange kernel values 4, 6 of the channel 1 of the original kernel 820 as $A5_{11}$, $A5_{12}$ of the kernel A5 865, and pads 0 to the remaining values $A5_{21}$, $A5_{22}$. In the same manner, the electronic device 2000 may rearrange kernel values 4, 6 of the channel 2 of the original kernel 820 as $A6_{11}$, $A6_{12}$ of the kernel A6 866, and pads0 to the remaining values $A6_{21}$, $A6_{22}$.

Also, the electronic device 2000 may rearrange a kernel value 5 of the channel 1 of the original kernel 820 as $A7_{11}$ of the kernel A7 867, and pads 0 to the remaining values $A7_{12}$, $A7_{21}$, $A7_{22}$. In the same manner, the electronic device 2000 may rearrange a kernel value 5 of the channel 2 of the original kernel as $A8_{11}$ of the kernel A8 868, and pads 0 to the remaining values $A8_{12}$, $A8_{21}$, $A8_{22}$.

The electronic device 2000 according to an embodiment of the disclosure may apply a convolution operation method to the channel-extended input feature map 850 and the channel-extended kernel 860. For example, the electronic device 2000 may obtain the feature value A 872 of the channel-extended output feature map 870, by performing element-wise multiplication of the channel-extended input feature map 850 and the kernel A1 861 through the kernel A8 868 and adding all result values. In the same manner, the electronic device 2000 may obtain all elements of the channel-extended output feature map 870, by obtaining the feature values B, C, and D of the channel-extended output feature map 870. Element values of each channel-extended output feature map 870 may be the same as element values of the original output feature map 830. That is, the electronic device 2000 may perform the same operation as an original neural network operation in a channel-extended manner.

In some embodiments, the channel-extended output feature map 870 may be obtained by using the channel-extended input feature map 850 and the channel-extended kernel 860. For example, a size of the channel-extended input feature map 850 may be $(H_I/B_H)*(W_I/B_W)=2*2$, a size of the channel-extended kernel 860 may be $K_H*K_W=2*2$, a channel of the channel-extended input feature map 850 and the channel-extended kernel 860 may be $C_I=8$, a size of the channel-extended output feature map 870 may be $(H_O/B_H)*(W_O/B_H)=1*1$, and a channel of the channel-extended output feature map 870 may be $C_O=4$.

The electronic device 2000 may obtain a performance gain of an accelerator, by performing a channel-extended neural network operation by using a modified operation. In the case of a convolution operation, the performance of a convolution operation in an MPU in which a channel is fixed to $C_{fix}$ is proportional to $(H_I*W_I*C_{fix}*K_w*K_h*C_o)/(STR_h*STR_w)$ that is the number of multiplication operations, (where $STR_h$ and $STR_w$ denote stride).

In a specific example, it is assumed that, in an accelerator in which a channel is fixed to 32, a modified operation with a kernel size of $(K_h, K_w, C_o)=(3, 3, 8)$ is to be applied to a feature map with a size of $(H_I, W_I, C_I)=(256, 256, 8)$ (assuming a general case where padding remains the same and stride=1). In this case, an original convolution operation includes $256*256*32*3*3*8=150,994,944$ multiplication operations in an MPU. In contrast, when a modified operation is applied assuming that $(B_h, B_w)=(2, 2)$, a size of a channel-extended feature map becomes $(H_I, W_I, C_I)=(128, 128, 32)$ and a size of a channel-extended kernel is modified into $(K_h, K_w, C_o)=(2, 2, 32)$. In this case, because the modified operation includes $128*128*32*2*2*32=67,108,864$ multiplication operations in the MPU, the number of operations is reduced by 55.6% compared to the existing original operation. Because this is an example of an operation on one layer, when a channel-extended neural network operation is performed by extending a channel of an input/output feature map of many layers in a model, with respect to neural network models including small channels, a performance gain of an accelerator may be increased.

Figure 9:
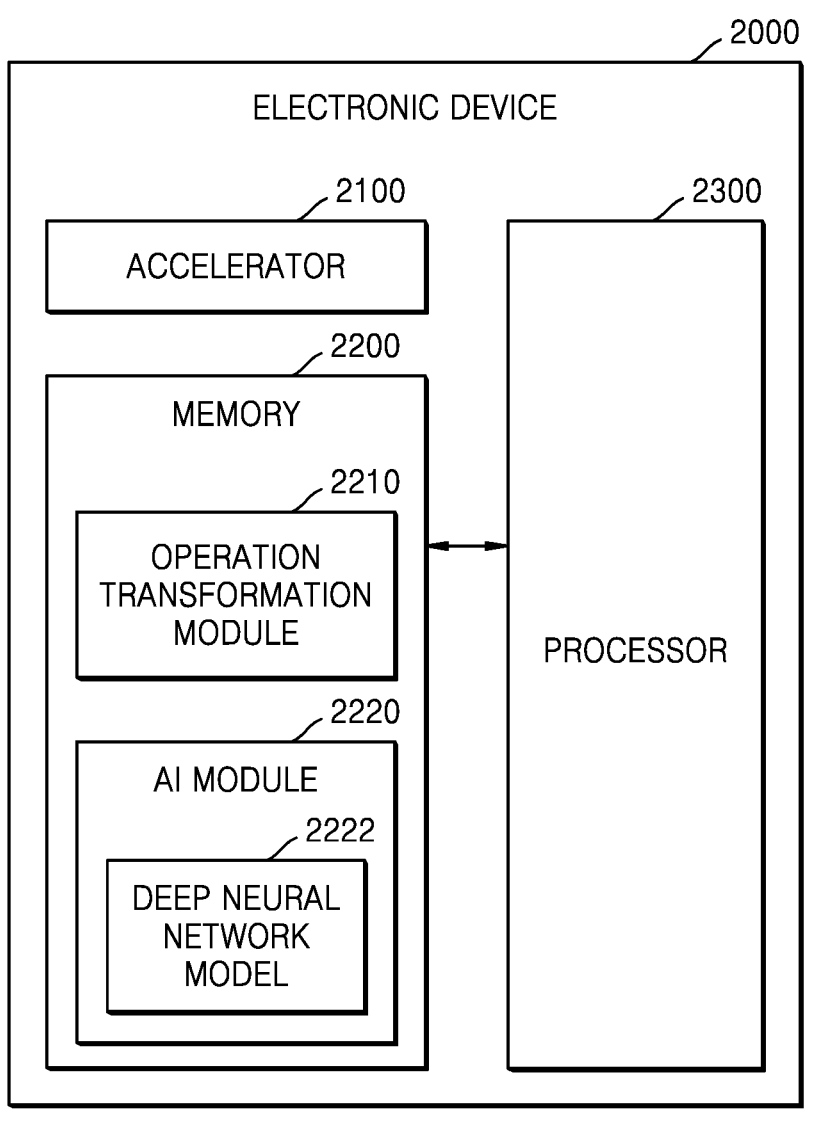
FIG. 9 is a block diagram illustrating a configuration of an electronic device, according to an embodiment of the disclosure.

FIG. 9 is a block diagram illustrating a configuration of an electronic device, according to an embodiment of the disclosure.

In some embodiments, the electronic device 2000 may include an accelerator 2100, a memory 2200, and a processor 2300.

The accelerator 2100 according to an embodiment of the disclosure may perform a deep neural network operation of a deep neural network model. Examples of the accelerator 2100 may include, but are not limited to, a central processing unit (CPU), a graphics processing unit (GPU), a field-programmable gate array (FPGA), a system-on-chip (SoC), an application-specific integrated circuit (ASIC), a vision processing unit (VPC), and a neuromorphic IC.

The accelerator 2100 of the electronic device 2000 may include a multiply-accumulate (MAC) unit for processing a data operation. Specifications of the accelerator 2100 may include the number of MAC units included in the accelerator 2100. For example, when the number of MAC units is N, N parallel operations may be performed in the accelerator 2100.

In some embodiments, the accelerator 2100 may perform at least a part of a function of the processor 2300 (e.g., a CPU) described below according to a hardware type.

The processor 2200 may store various data, a program, an application for driving and controlling the electronic device 2000. The program stored in the memory 2200 may include one or more instructions. The program (the one or more instructions) or the application stored in the memory 2200 may be executed by the processor 2300.

The memory 2200 may include a non-volatile memory including at least one of a flash memory type, a hard disk type, a multimedia card micro type, a card type memory (e.g., SD or XD memory), a read-only memory (ROM), an electrically erasable programmable read-only memory (EP-PROM), a programmable read-only memory (PROM), a magnetic memory, a magnetic disk, and an optical disk, and a volatile memory such as a random-access memory (RAM) or a static random-access memory (SRAM).

The memory 2200 according to an embodiment of the disclosure may store one or more instructions and/or a program so that the electronic device 2000 performs a neural network operation. For example, the memory 2200 may store an operation transformation module 2210, an artificial intelligence (AI) module 2220, and a deep neural network model 2222.

The processor 2300 may control overall operations of the electronic device 2000. The processor 2300 may execute the one or more programs stored in the memory 2200. One or more processors 2300 may be provided.

The one or more processors according to the disclosure may include at least one of a central processing unit (CPU), a graphics processing unit (GPU), an accelerated processing unit (APU), a many integrated core (MIC), a digital signal processor (DSP), or a neural processing unit (NPU). The one or more processors may be implemented as an integrated system-on-chip (SoC) including one or more electronic components. Each of the one or more processors may be implemented as separate hardware (H/W).

The processor 2300 may execute the operation transformation module 2210, so that the electronic device 2000 modifies a neural network operation. For example, the processor 2300 may determine a first layer for starting application of a modified operation and a second layer for ending the application of the modified operation. The processor 2300 may perform a modified operation of extending a channel of an output of a deep neural network layer. The modified operation may include a space-to-depth transformation operation. The processor 2300 may receive a channel-extended input and may perform a modified operation of reducing a channel of an output of a deep neural network layer. The modified operation may include a depth-to-space transformation operation. In order to perform the modified operation, the processor 2300 may change an order of data stored in an RAM or the like included in the memory 2200.

When the processor 2300 executes the operation transformation module 2210 to extend or reduce a channel of a feature map, a size to which a modified operation extends or reduces the channel of the feature map may be determined based on specifications of the MAC units included in the accelerator 2100. For example, when the number of MAC units is N, the processor 2300 may set a channel transformation size to N. However, the disclosure is not limited thereto.

In some embodiments, the electronic device 2000 may obtain a modified deep neural network model from another external device (e.g., a server or a local PC). The modified deep neural network model refers to a change in a design/architecture of a deep neural network model to perform a modified operation and/or a channel-extended neural network operation, so that electronic device 2000 efficiently uses the accelerator 2100 as in the above embodiments. Accordingly, the external device may be a device in which a neural network compiler for changing a deep neural network model is stored. Alternatively, the external device itself may be referred to as a neural network compiler. When the electronic device 2000 performs a neural network operation by using a modified deep neural network model, the operation may be performed with high performance, without transformation overhead occurring in an operation transformation process of the operation transformation module 2210. That is, the electronic device 2000 may perform a deep neural network operation of efficiently using computing resources of the electronic device 2000 according to embodiments disclosed as a modified deep neural network model.

The processor 2300 may execute the AI module 2220, so that the electronic device 2000 obtains an output of the deep neural network model 2222. The processor 2300 may execute execution code of the deep neural network model 2222, to perform operations for obtaining an output from the deep neural network model (e.g., image classification result inference of a convolutional neural network model). In this case, an operation of the deep neural network model 2222 may include a modified operation. Also, when the modified operation is applied, a channel-extended neural network operation may be applied, which has been described above, and thus, a repeated description will be omitted. In this case, a neural network operation may be performed by using the accelerator 2100.

In some embodiments, when a method includes a plurality of operations, the plurality of operations may be performed by one processor or may be performed by a plurality of processors. For example, when a first operation, a second operation, and a third operation are performed by a method according to an embodiment of the disclosure, all of the first operation, the second operation, and the third operation may be performed by a first processor, or the first operation and the second operation may be performed by a first processor (e.g., a general-purpose processor) and the third operation may be performed by a second processor (e.g., an AI processor). The AI processor that is the second processor may be replaced with the accelerator 2100. However, embodiments of the disclosure are not limited thereto.

The one or more processors may include a single core processor, or a multicore processor.

In some embodiments, when a method includes a plurality of operations, the plurality of operations may be performed by one core, or may be performed by a plurality of cores included in one or more processors.

A method by which an electronic device performs a deep neural network (DNN) operation may include: performing a first modified operation, the first modified operation comprising extending a channel of an output of a first layer with respect to a feature map input into the first layer, the first layer being one of a plurality of layers of a DNN, wherein the first modified operation comprises a space-to-depth transformation operation; performing a neural network operation corresponding to layers between the first layer and a second layer as a channel-extended neural network operation, wherein the second layer is a layer of the plurality of layers of the DNN after the first layer; performing a second modified operation, the second modified operation comprising reducing a channel of an output of the second layer with respect to a channel-extended feature map input into the second layer, wherein the second modified operation comprises a depth-to-space transformation operation; and outputting a result of the DNN operation.

A channel transformation size of each of the first modified operation and the second modified operation may be preset based on specifications of multiply-accumulate (MAC) units of an accelerator included in the electronic device.

An output of the DNN operation to which the first modified operation and the second modified operation are applied may be same as an original operation result of the DNN.

The first layer may be a foremost layer of the plurality of layers of the DNN.

The second layer may be a last layer of the plurality of layers of the DNN.

The performing of the neural network operation may include performing a layer operation by using a channel-extended input feature map, and transmitting a channel-extended output feature map to a next layer.

The first modified operation and the second modified operation may correspond to an operation type (e.g. convolution operation) of the DNN.

The DNN may be a convolutional neural network (CNN) comprising one or more convolution layers.

The first layer may be a first convolution layer of the one or more convolution layers, wherein the performing of the first modified operation includes: modifying a kernel of the first convolution layer; and obtaining a channel-extended output feature map, by using an input feature map input into the first convolution layer and the modified kernel of the first convolution layer.

The second layer may be a second convolution layer of the one or more convolution layers, wherein the performing of the second modified operation includes: modifying a kernel of the second convolution layer; and obtaining a channel-reduced output feature map, by using the channel-extended feature map input into the second convolution layer and the modified kernel of the second convolution layer.

The first modified operation may include applying a convolution operation method, and the second modified operation may include applying a transposed convolution operation method.

Embodiments of the disclosure may also be realized in a form of a recording medium including instructions executable by a computer, such as a program module executed by a computer. A computer-readable medium may be an arbitrary available medium accessible by a computer, and includes all volatile and non-volatile media and separable and non-separable media. Further, examples of the computer-readable medium may include computer storage media and communication media. Examples of the computer storage medium include all volatile and non-volatile media and separable and non-separable media, which have been implemented by an arbitrary method or technology, for storing information such as computer-readable instructions, data structures, program modules, and other data. The communication medium may typically include other data of a modulated data signal, such as computer-readable instructions, a data structure, or a program module.

The computer-readable storage medium may be provided in a form of a non-transitory storage medium. Here, 'non-transitory' means that the storage medium does not include a signal and is tangible, but does not distinguish whether data is stored semi-permanently or temporarily in the storage medium. For example, the 'non-transitory storage medium' may include a buffer in which data is temporarily stored.

According to an embodiment of the disclosure, methods according to various embodiments of the disclosure may be provided in a computer program product. The computer program product is a product purchasable between a seller and a purchaser. The computer program product may be distributed in a form of machine-readable storage medium (e.g., a compact disc read-only memory (CD-ROM)), or distributed (e.g., downloaded or uploaded) through an application store or directly or online between two user devices (e.g., smart phones). When distributed online, at least part of the computer program product (e.g., a downloadable application) may be temporarily generated or at least temporarily stored in a machine-readable storage medium, such as a memory of a manufacturer's server, a server of an application store, or a relay server.

The above description of the disclosure is provided for illustration, and it will be understood by one of ordinary skill in the art that various changes in form and details may be readily made therein without departing from essential features and the scope of the disclosure as defined by the following claims. Hence, the embodiments of the disclosure should be considered in descriptive sense only and not for purposes of limitation. For example, each component described as a single type may be implemented in a distributed manner, and similarly, components described as distributed may be implemented in a combined form.

The scope of the disclosure is defined by the appended claims rather than the detailed description, and all changes or modifications within the scope of the appended claims and their equivalents will be construed as being included in the scope of the disclosure.

The invention claimed is:

1. A method by which an electronic device performs a convolutional neural network (CNN) operation, the method comprising:

performing a first modified operation at a first convolution layer of the CNN, wherein the first modified operation achieves an effect corresponding to a space-to-depth transformation operation, and comprises:

modifying a kernel of the first convolution layer to obtain a first modified kernel, and obtaining a channel-extended output feature map directly from an input feature map of the first convolution layer by applying a convolution operation using the first modified kernel;

performing a neural network operation corresponding to layers between a first layer and a second layer as a channel-extended neural network operation, wherein the second layer is a layer of a plurality of layers of the CNN after the first layer;

performing a second modified operation at a second convolution layer of the CNN, wherein the second modified operation achieves an effect corresponding to a depth-to-space transformation operation, and comprises:

modifying a kernel of the second convolution layer to obtain a second modified kernel, and obtaining a channel-reduced output feature map, directly from a channel-extended feature map input into the second convolution layer by applying a transposed convolution operation using the second modified kernel; and outputting a result of the CNN operation.

2. The method of claim 1, wherein a channel transformation size of each of the first modified operation and the second modified operation is preset based on specifications of multiply-accumulate (MAC) units of an accelerator included in the electronic device.

3. The method of claim 1, wherein an output of the CNN operation to which the first modified operation and the second modified operation are applied is same as an original operation result of the CNN.

4. The method of claim 1, wherein the first layer is a foremost layer of the plurality of layers of the CNN, and the second layer is a last layer of the plurality of layers of the CNN.

5. The method of claim 1, wherein the performing of the neural network operation comprises performing a layer operation by using a channel-extended input feature map, and transmitting the channel-extended output feature map to a next layer.

6. The method of claim 1, wherein the first modified operation and the second modified operation correspond to an operation type of the CNN.

7. An electronic device for performing a convolutional neural network (CNN) operation, the electronic device comprising:

an accelerator;

a memory storing one or more instructions; and at least one processor configured to execute the one or more instructions stored in the memory to:

perform a first modified operation at a first convolution layer of the CNN, wherein the first modified operation achieves an effect corresponding to a space-to-depth transformation operation, and comprises:

modify a kernel of the first convolution layer to obtain a first modified kernel, and obtain a channel-extended output feature map directly from an input feature map of the first convolution layer by applying a convolution operation using the first modified kernel;

perform a neural network operation corresponding to layers between a first layer and a second layer as a channel-extended neural network operation, wherein the second layer is a layer of a plurality of layers of the CNN after the first layer;

perform a second modified operation at a second convolution layer of the CNN, wherein the second modified operation achieves an effect corresponding to a depth-to-space transformation operation, and comprises:

modify a kernel of the second convolution layer to obtain a second modified kernel, and obtain a channel-reduced output feature map, directly from the channel-extended feature map input into the second convolution layer by applying a transposed convolution operation using the second modified kernel; and output a result of the CNN operation.

8. The electronic device of claim 7, wherein a channel transformation size of each of the first modified operation and the second modified operation is preset based on specifications of multiply-accumulate (MAC) units of the accelerator included in the electronic device.

9. The electronic device of claim 7, wherein an output of the CNN operation to which the first modified operation and the second modified operation are applied is same as an original operation result of the CNN.

10. The electronic device of claim 7, wherein the first layer is a foremost layer of the plurality of layers of the CNN, and the second layer is a last layer of the plurality of layers of the CNN.

11. The electronic device of claim 7, wherein the at least one processor is further configured to execute the one or more instructions to, when the channel-extended neural network operation is performed by using the accelerator, perform a layer operation by using the channel-extended input feature map, and transmit a channel-extended output feature map to a next layer.

12. The electronic device of claim 7, wherein the first modified operation and the second modified operation correspond to an operation type of the CNN.

13. A non-transitory computer-readable recording medium having recorded thereon a program for executing, on a computer, a method by which an electronic device performs a convolutional neural network (CNN) operation, the method comprising:

performing a first modified operation at a first convolution layer of the CNN, wherein the first modified operation achieves an effect corresponding to a space-to-depth transformation operation, and comprises:

modifying a kernel of the first convolution layer to obtain a first modified kernel, and obtaining a channel-extended output feature map directly from an input feature map of the first convolution layer by applying a convolution operation using the first modified kernel;

performing a neural network operation corresponding to layers between a first layer and a second layer as a channel-extended neural network operation, wherein the second layer is a layer of a plurality of layers of the CNN after the first layer;

performing a second modified operation at a second convolution layer of the CNN, wherein the second modified operation achieves an effect corresponding to a depth-to-space transformation operation, and comprises:

modifying a kernel of the second convolution layer to obtain a second modified kernel, and obtaining a channel-reduced output feature map, directly from a channel-extended feature map input into the second convolution layer by applying a transposed convolution operation using the second modified kernel; and outputting a result of the CNN operation.

* * * * *